(12) United States Patent
Yano

(10) Patent No.: US 6,198,575 B1
(45) Date of Patent: Mar. 6, 2001

(54) OPTICAL SYSTEM FOR OBSERVING DEVICE HAVING IMAGE-VIBRATION COMPENSATION SYSTEM

(75) Inventor: Takaaki Yano, Hokkaido (JP)

(73) Assignee: Asahi Kogaku Kogyo Kabushiki Kaisha, Tokyo (JP)

( * ) Notice: Subject to any disclaimer, the term of this patent is extended or adjusted under 35 U.S.C. 154(b) by 0 days.

(21) Appl. No.: 09/392,778

(22) Filed: Sep. 9, 1999

(30) Foreign Application Priority Data

Sep. 10, 1998 (JP) .................................................. 10-256836

(51) Int. Cl.$^7$ .................................................. G02B 27/64
(52) U.S. Cl. .......................... 359/557; 359/407; 359/409; 359/554
(58) Field of Search ..................................... 359/362, 399, 359/404, 407, 409, 421, 422, 431, 554–557, 689–690, 784, 708; 396/52–55; 348/208

(56) References Cited

U.S. PATENT DOCUMENTS 5,000,549 * 3/1991 Yamazaki .............................. 359/557
5,521,758 * 5/1996 Hamano ................................ 359/554
5,581,400 * 12/1996 Takase et al. ........................ 359/431
5,694,244 * 12/1997 Abe et al. ............................. 359/431
5,917,653 * 6/1999 Taniguchi ............................ 359/557

FOREIGN PATENT DOCUMENTS 61-156019 * 7/1986 (JP) ..................................... 359/431
6-43365    2/1994 (JP) .
6-308431  11/1994 (JP) .

* cited by examiner

*Primary Examiner*—Thong Nguyen
(74) *Attorney, Agent, or Firm*—Greenblum & Bernstein, P.L.C.

(57) ABSTRACT

An optical system for a binocular is provided with an objective optical system, an erecting system and an observing optical system. The objective optical system includes a first lens having positive refractive power, a second lens and a third lens arranged in the order from an object side. At least one lens surface of the first lens is an aspherical surface. One of the second and third lenses has positive refractive power, the other has negative refractive power. The first lens is capable of moving in a direction orthogonal to an optical axis to stabilize an image.

5 Claims, 21 Drawing Sheets

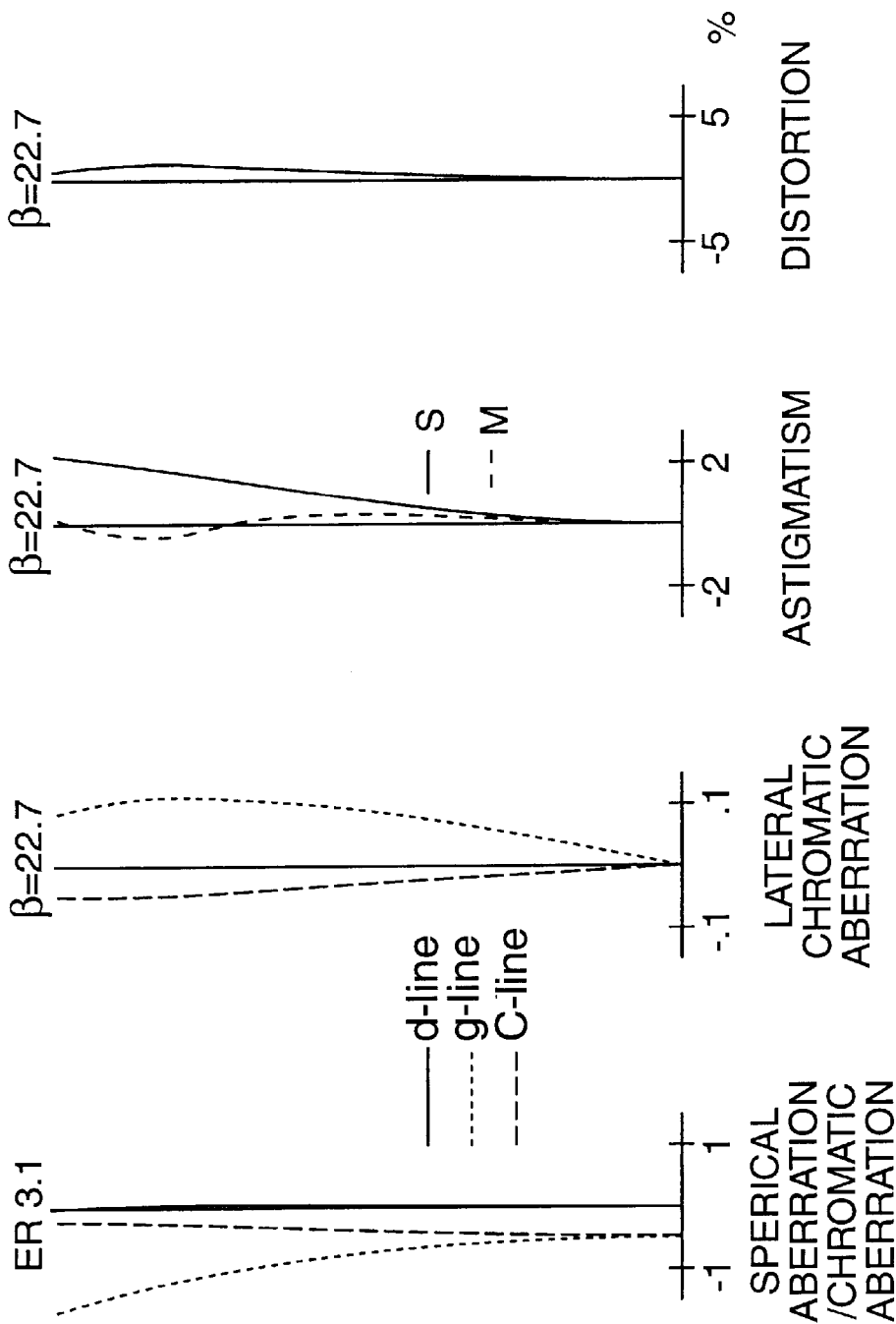

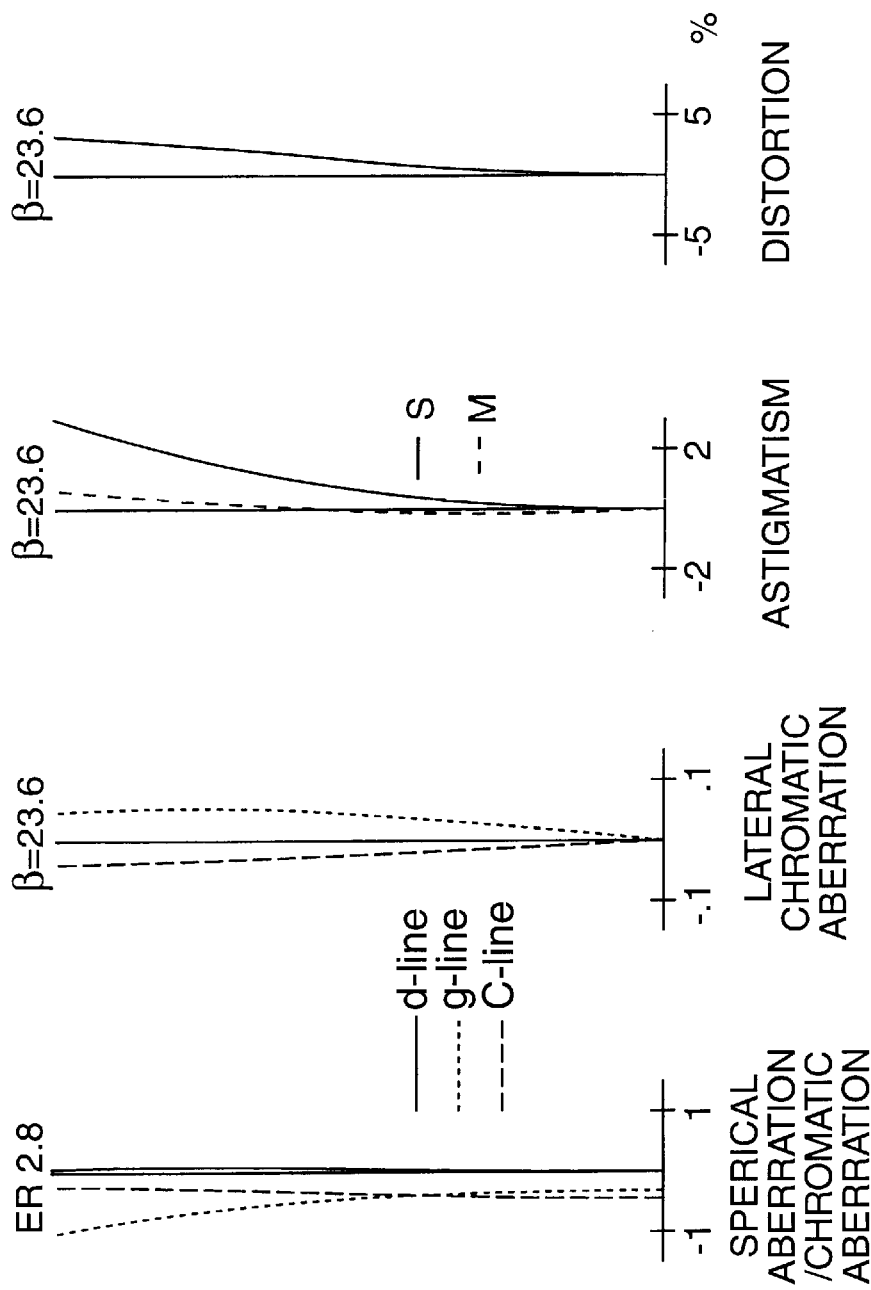

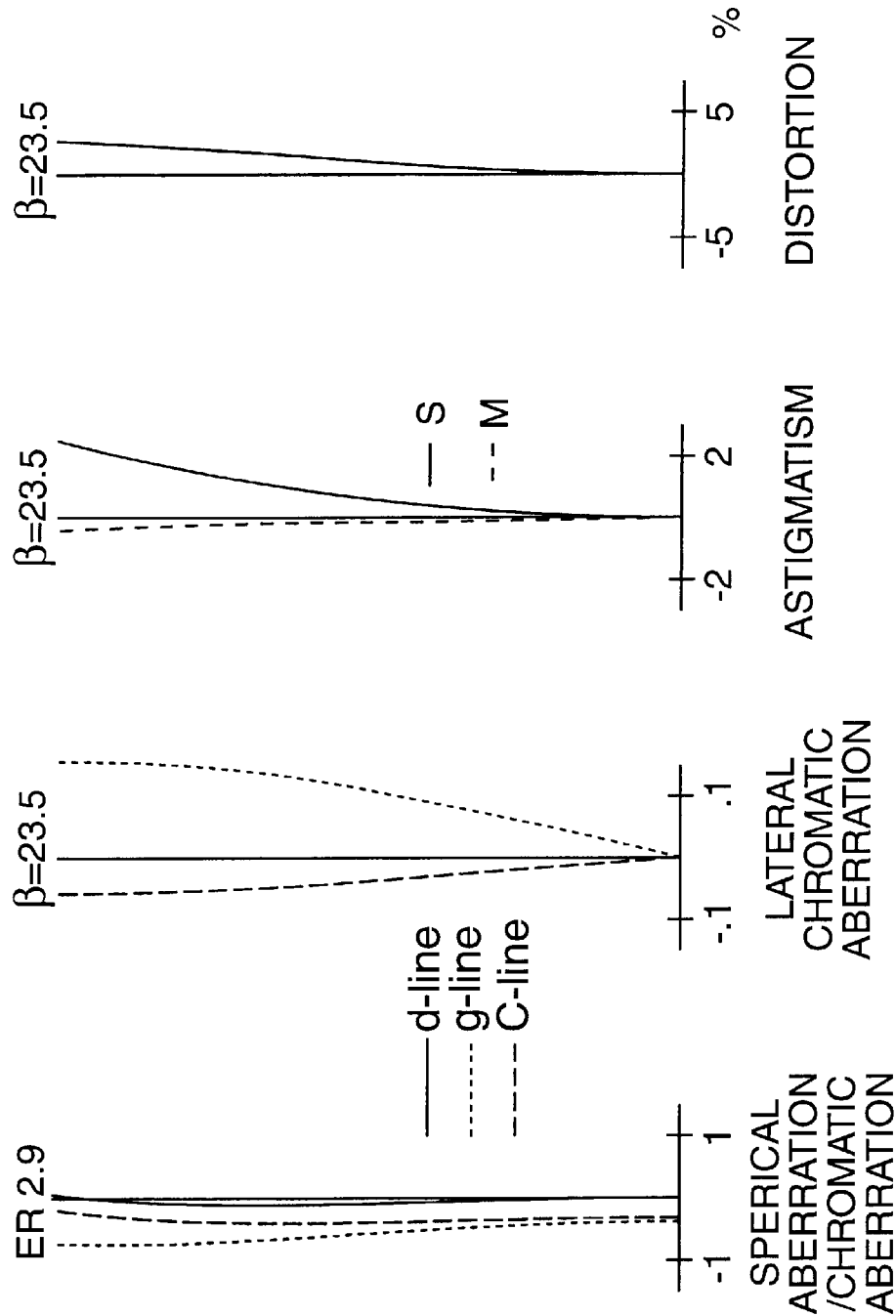

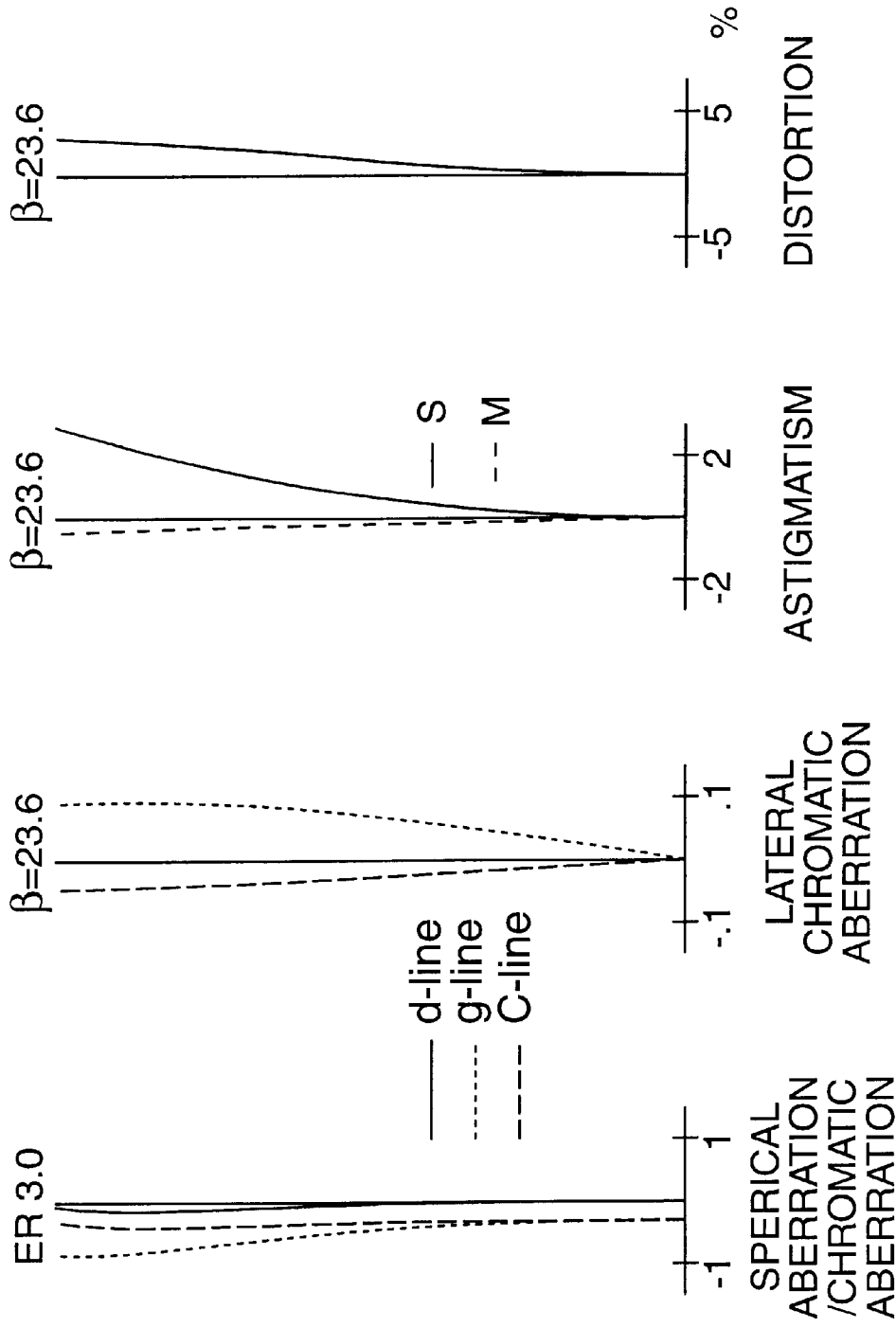

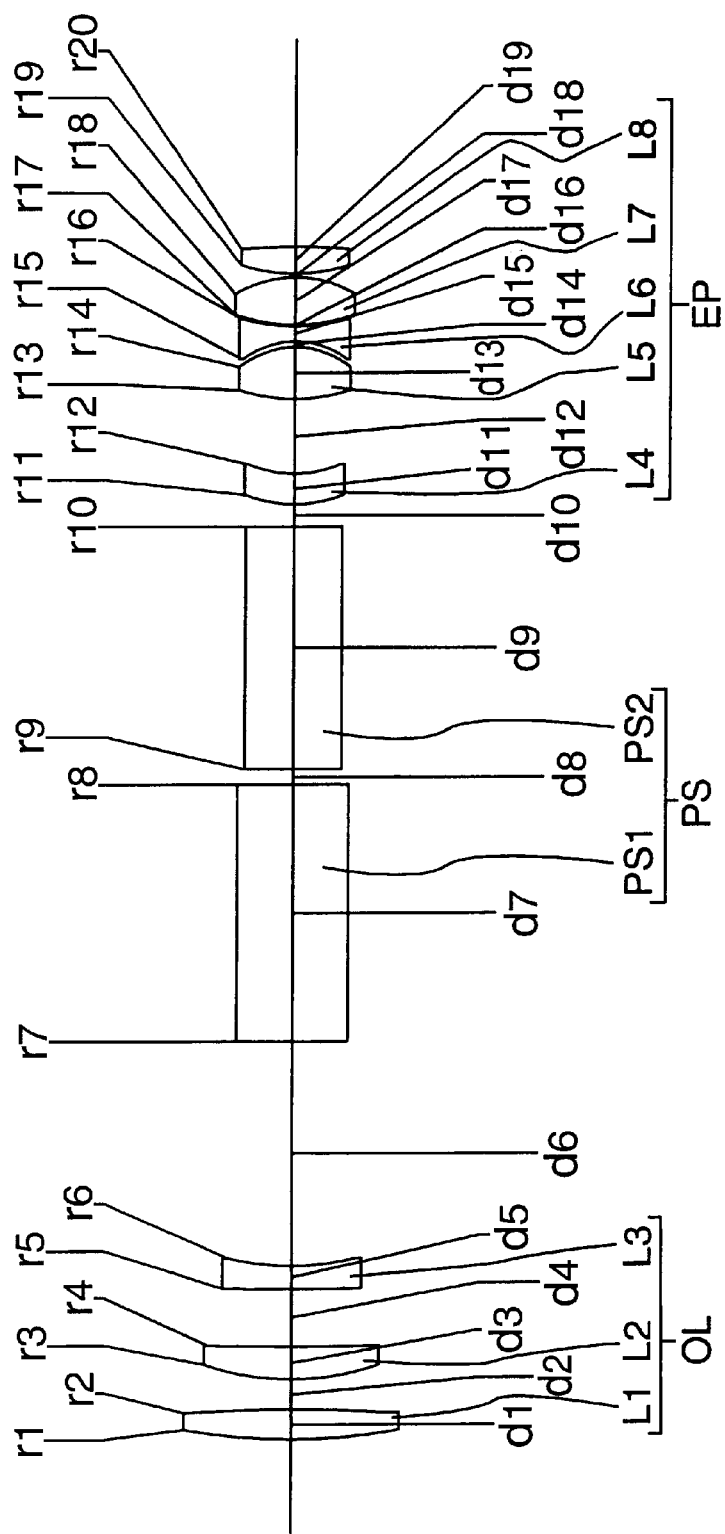

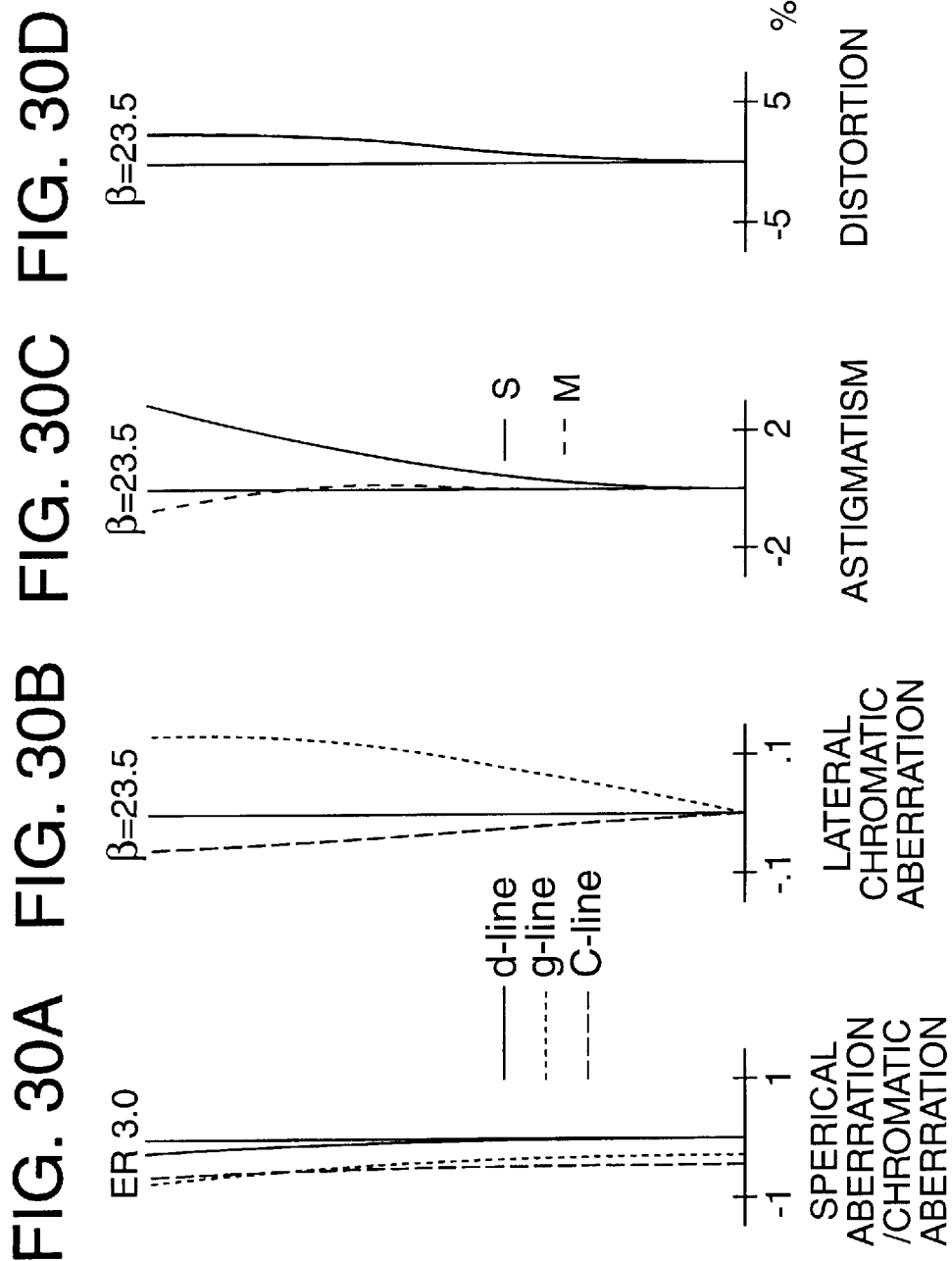

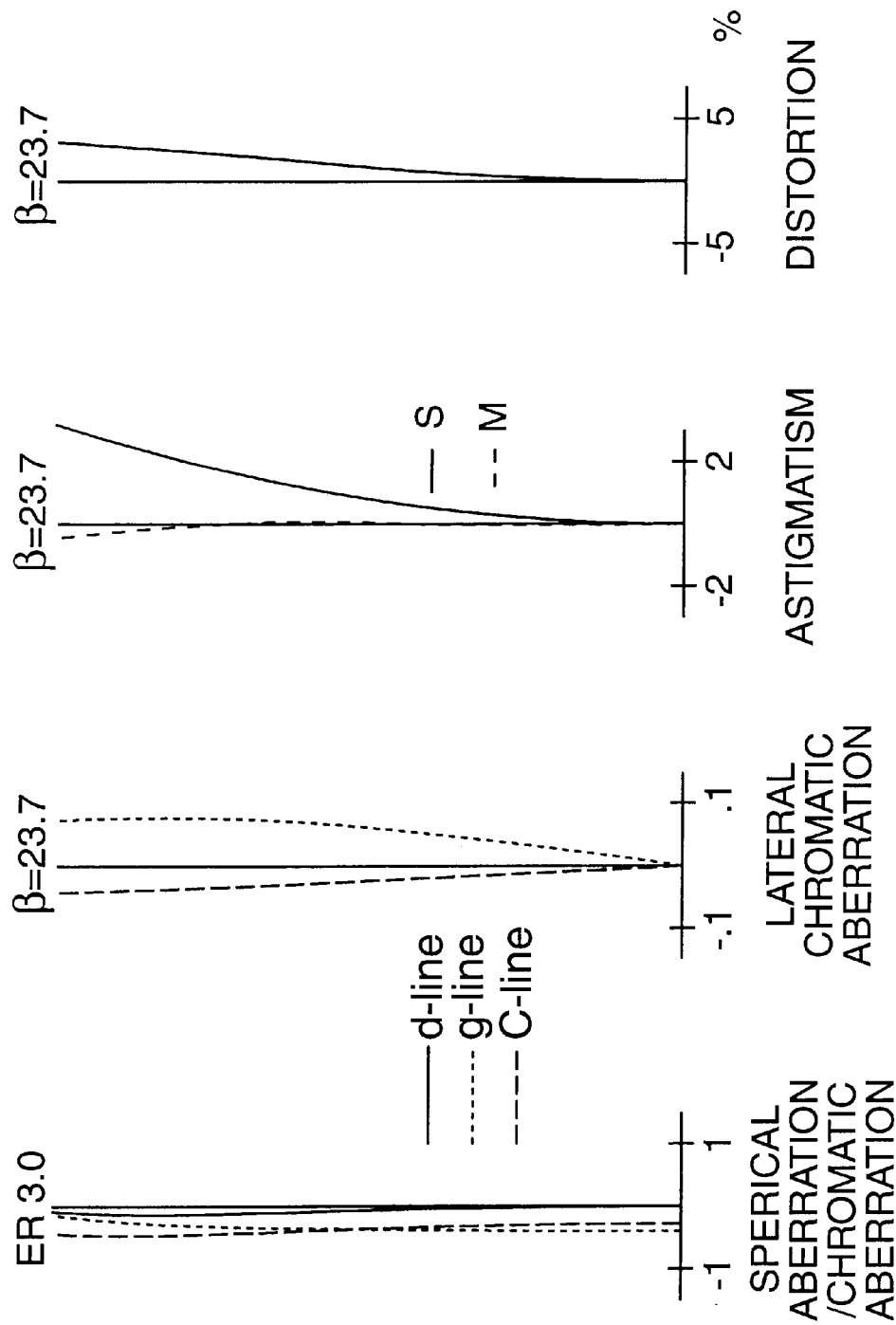

OPTICAL SYSTEM FOR OBSERVING DEVICE HAVING IMAGE-VIBRATION COMPENSATION SYSTEM

BACKGROUND OF THE INVENTION

The present invention relates to an optical system for an observing device such as a binocular or a terrestrial telescope that has an image-vibration compensation system.

Recently, binoculars provided with image-vibration compensation systems for preventing vibration of an observed image due to a hand-held shake of a user have been developed. Japanese Laid Open Publication No. HEI 6-43365 discloses an image-vibration compensation system of a binocular that employs a variable angle prism for each of the telescopic optical systems of the binocular. FIG. 37 shows one example of the telescopic optical system that has the same arrangement of the optical components as the publication. The optical system includes an objective lens 1 that is a cemented doublet, a variable angle prism 2 as a compensation element, an erecting system 3 and an eyepiece 4. When the optical system vibrates due to hand-held shake of a user, the vertex angle of the variable angle prism 2 is controlled to stabilize the image.

In such a construction, however, since the variable angle prism 2 is located in the convergent light, if the vertex angle of the prism is changed, significant decentering coma occurs. FIG. 38 shows the axial coma at a standard condition where the vertex angle of the variable angle prism 2 is 0 degrees. FIG. 39 shows the axial coma when the variable angle prism 2 is angled to stabilize the image when the optical system is inclined by 1 degree. The image viewed by a user is deteriorated due to the decentering coma when the variable angle prism 2 is angled to compensate for the vibration of the image. While FIGS. 38 and 39 show the change of the coma in the specific example, the image vibration compensation system having the variable angle prism tends to generate the decentering coma in general.

Another example of the image-vibration compensation system for binoculars is disclosed in Japanese Laid Open Publication No. HEI 6-308431. The binocular in the publication employs a compensation device that is attached in front of the objective optical systems of the binocular. This arrangement can reduce the decentering coma when the compensation prism is angled. However, since the first lens of the objective optical system has the largest diameter in the telescopic optical system, in general, and the device is arranged in front of the first lenses, the device becomes large in size, which increases the size of the binocular.

SUMMARY OF THE INVENTION

It is therefore an object of the present invention to provide an optical system of an observing device having image-vibration compensation system, which is capable of preventing the decentering coma without increasing the size of the device.

For the above object, according to the present invention, there is provided an optical system of an observing device having an image-vibration compensation system. The optical system includes an objective optical system, an erecting system and an observing optical system arranged in the order from an object side, the objective optical system consisting of:

a first lens having positive refractive power, at least one lens surface of the first lens being an aspherical surface;

a second lens arranged at the erecting system side of the first lens; and a third lens arranged at the erecting system side of the second lens, wherein one of the second and third lenses has positive refractive power and the other has negative refractive power, and wherein the first lens is movable in a direction orthogonal to an optical axis of the objective optical system to compensate an image vibration due to a hand-held shake.

With this construction, since the first lens of the objective optical system is moved to compensate the image vibration, the decentering coma does not generate when the image vibration is compensated. Further, since the compensation element is a part of the objective optical system, the size of the observing device becomes smaller than the conventional device in which the extra prism is arranged at the object side of the objective optical system.

The optical system is preferable to satisfy the following conditions (1), (2) and (3):

$$0.5 < |(\tan 1°)/\phi_1| < 5.0 \text{ (unit:mm)} \quad (1)$$

$$|\phi_{23}/\phi_{13}| < 1.00 \quad (2)$$

$$1.0 < hi/hx < 1.5 \quad (3)$$

where, $\phi_1$ is a refractive power of the first lens, $\phi_{23}$ is a composite refractive power of the second and third lenses, $\phi_{13}$ is a composite refractive power of the objective optical system, hi is a height from an optical axis of an intersecting point of a paraxial axial ray on the object side surface of the second lens (hi≠0), and hx is a height from an optical axis of an intersecting point of the paraxial axial ray on the erecting system side surface of the third lens.

In the specification and claims, "the paraxial axial ray" is defined as a ray from an object point on an optical axis at infinity.

Further, the first lens of the objective optical system may be a plastic lens.

The second and third lenses may be cemented together. In such a case, the condition (4) is preferably satisfied:

$$-0.3 < \phi_4/\phi_{13} < 0.0 \quad (4)$$

where, $\phi_4$ is a refractive power of the cemented surface of the second and third lenses.

On the other hand, the second and third lenses may be independently arranged without being cemented. In such a case, the condition (5) is preferably satisfied:

$$D_{23}/f_{13} < 0.2 \quad (5)$$

where, $D_{23}$ is a distance between the object side surface of the second lens and the erecting system side surface of the third lens, and $f_{13}$ is a focal length of the objective optical system.

DESCRIPTION OF THE ACCOMPANYING DRAWINGS

Figure 1:
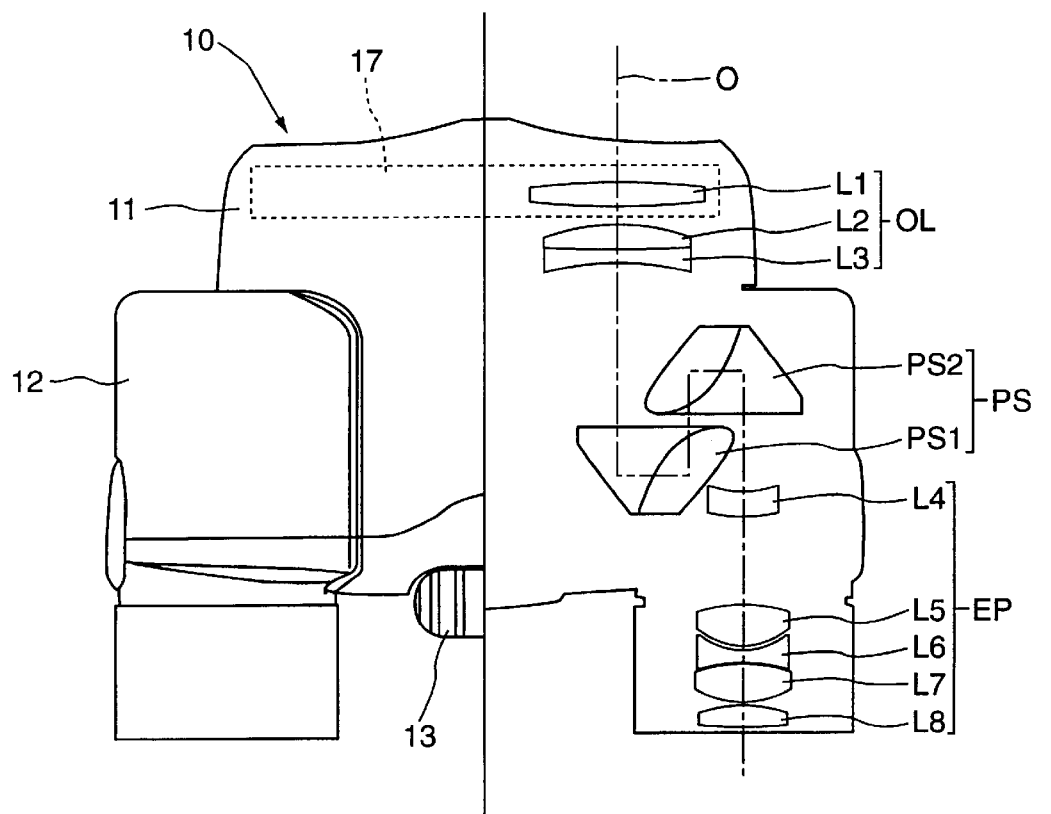
FIG. 1 is a plane view of a binocular that employs an optical system of the present invention with showing one of two telescopic optical systems.
Figure 3:
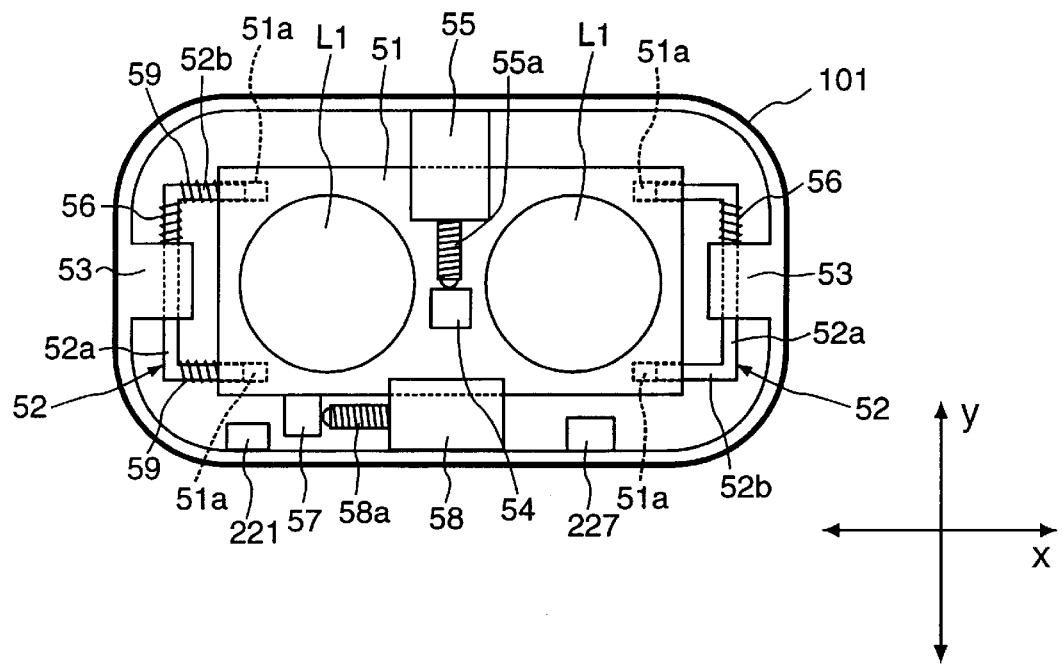
Figure 4:
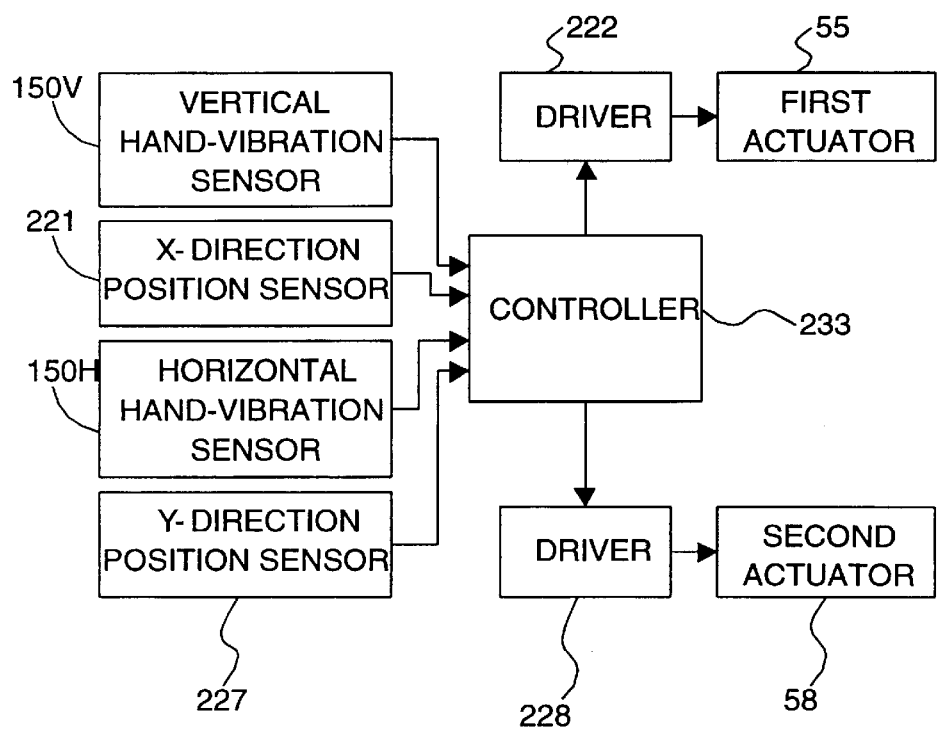
Figure 5:
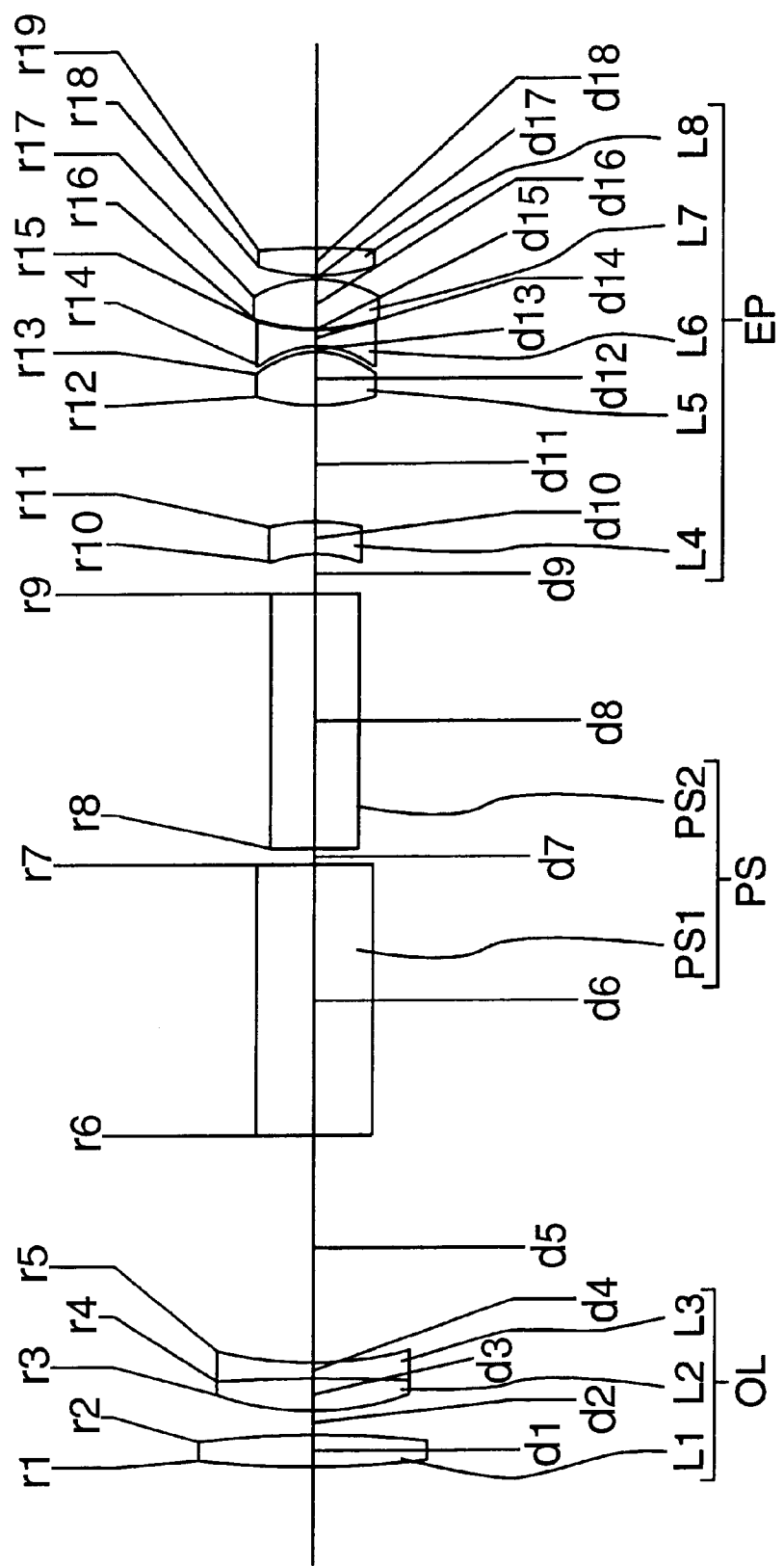
Figure 6:
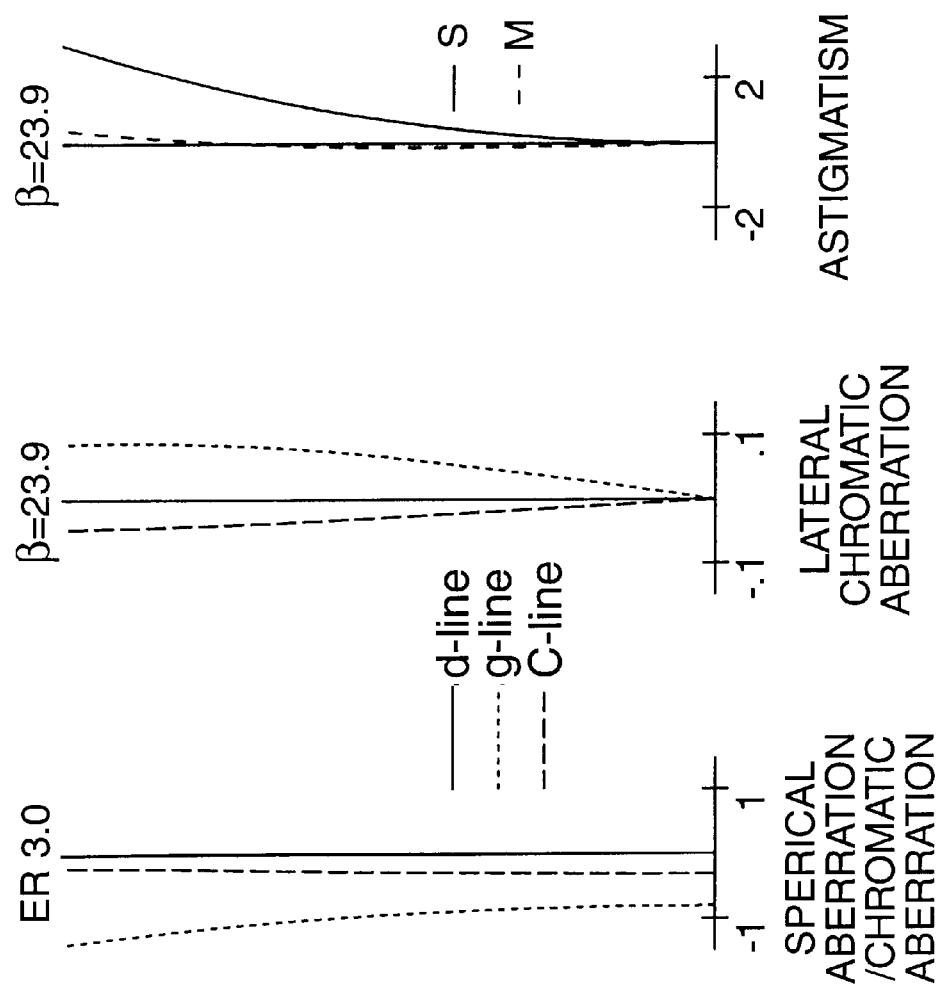
Figure 7:
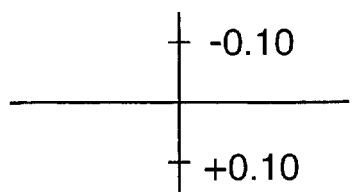
Figure 8:
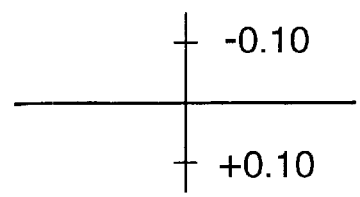
Figure 11:
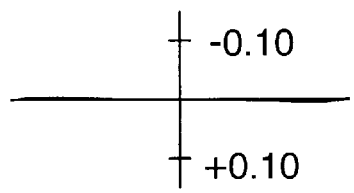
Figure 12:
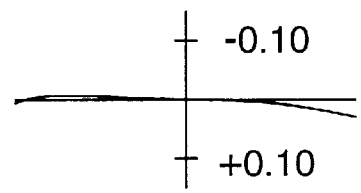
Figure 15:
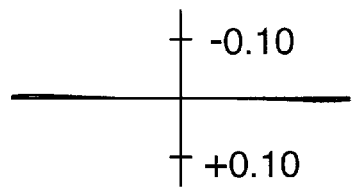
Figure 16:
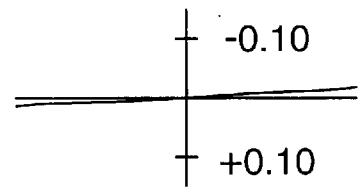
Figure 19:
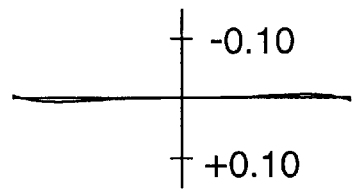
Figure 20:
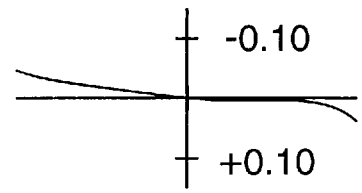
Figure 9:
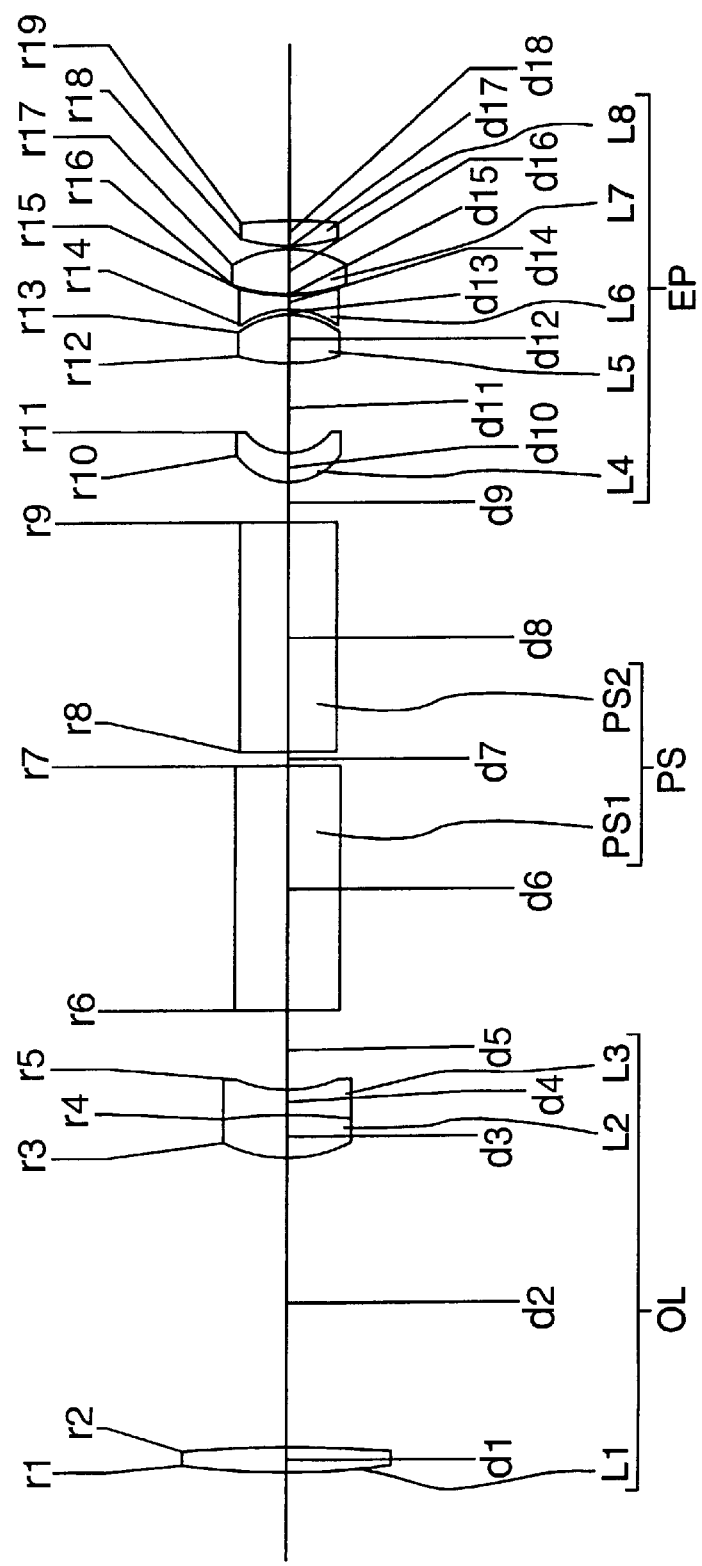
Figure 13:
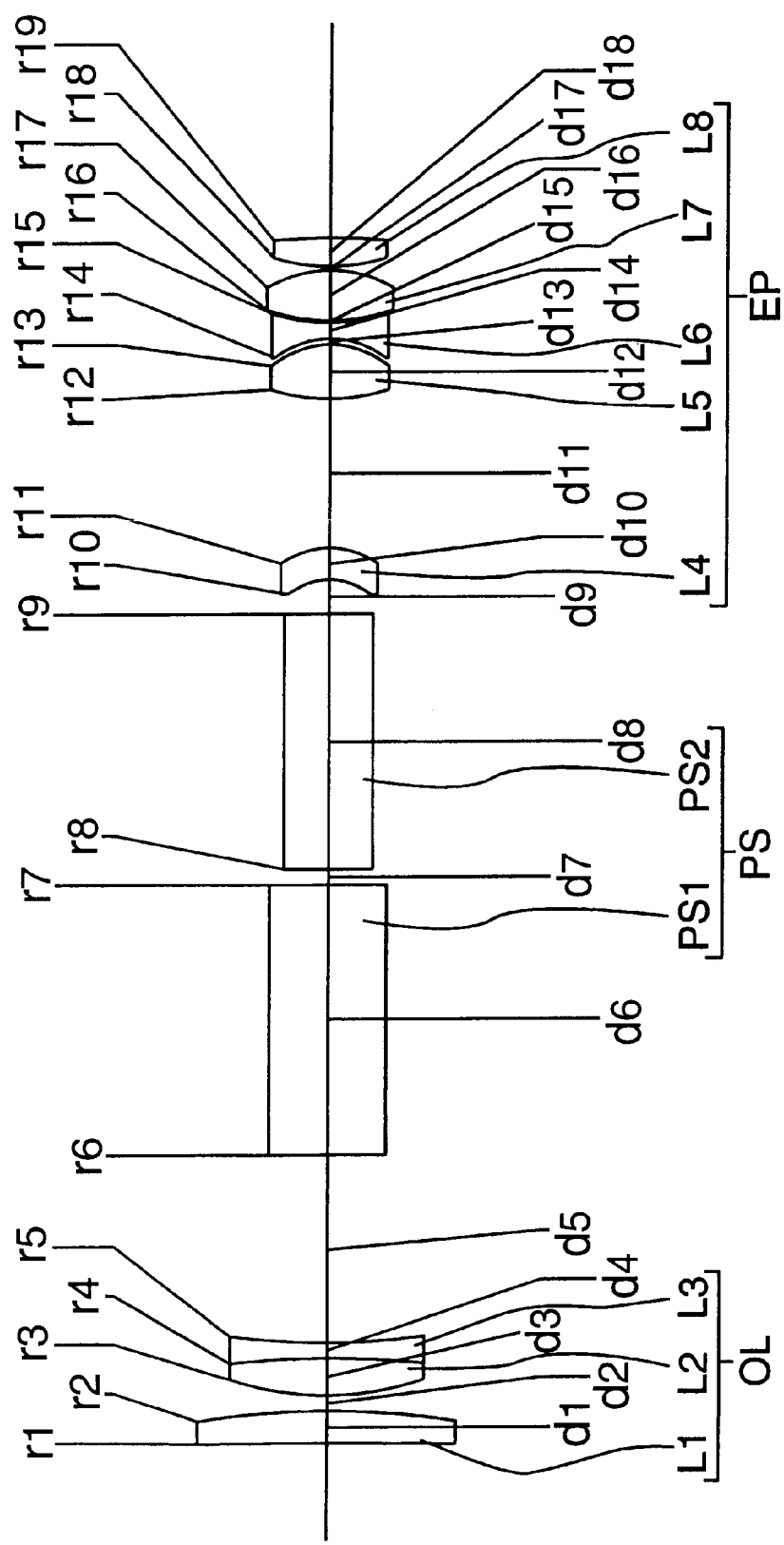
Figure 17:
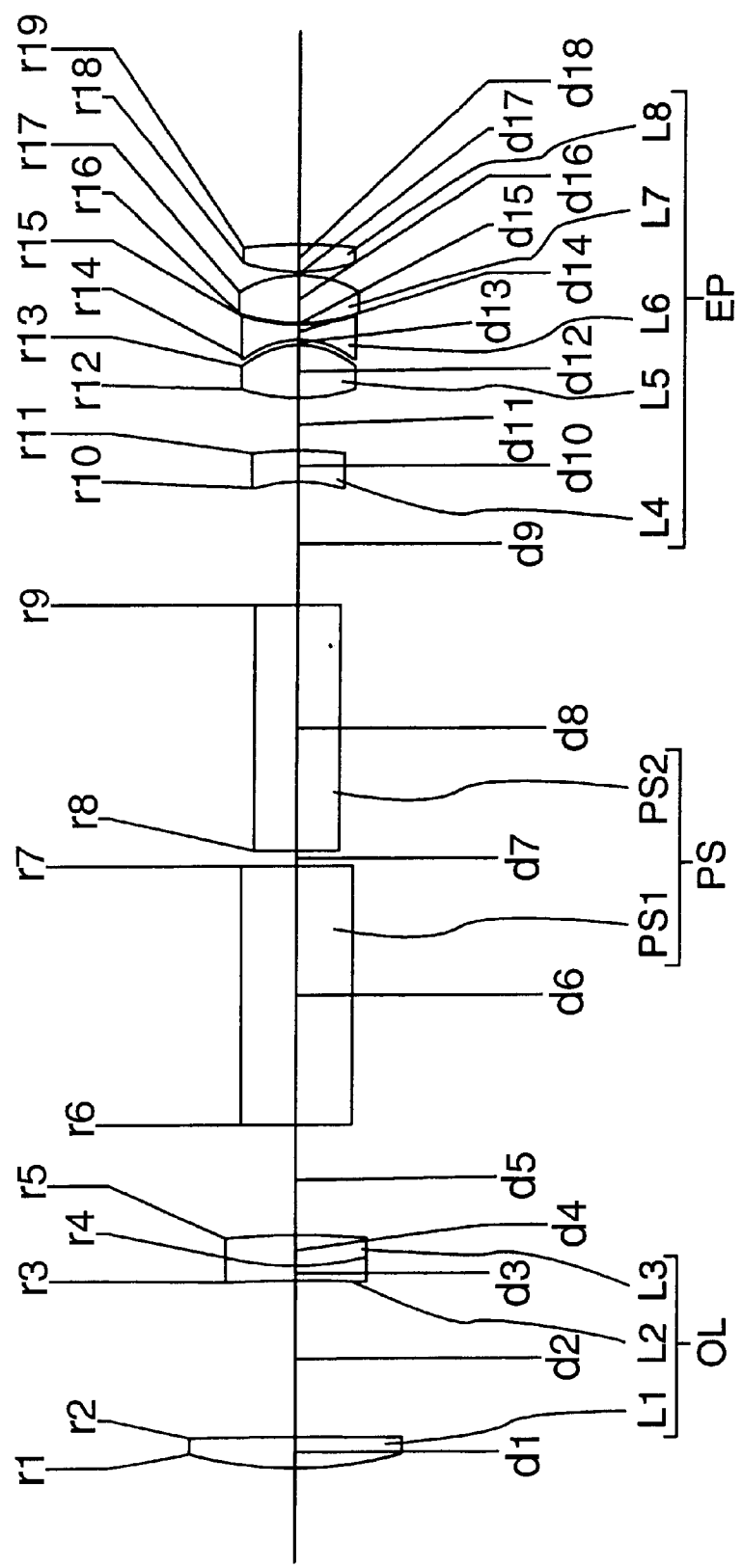
Figure 21:
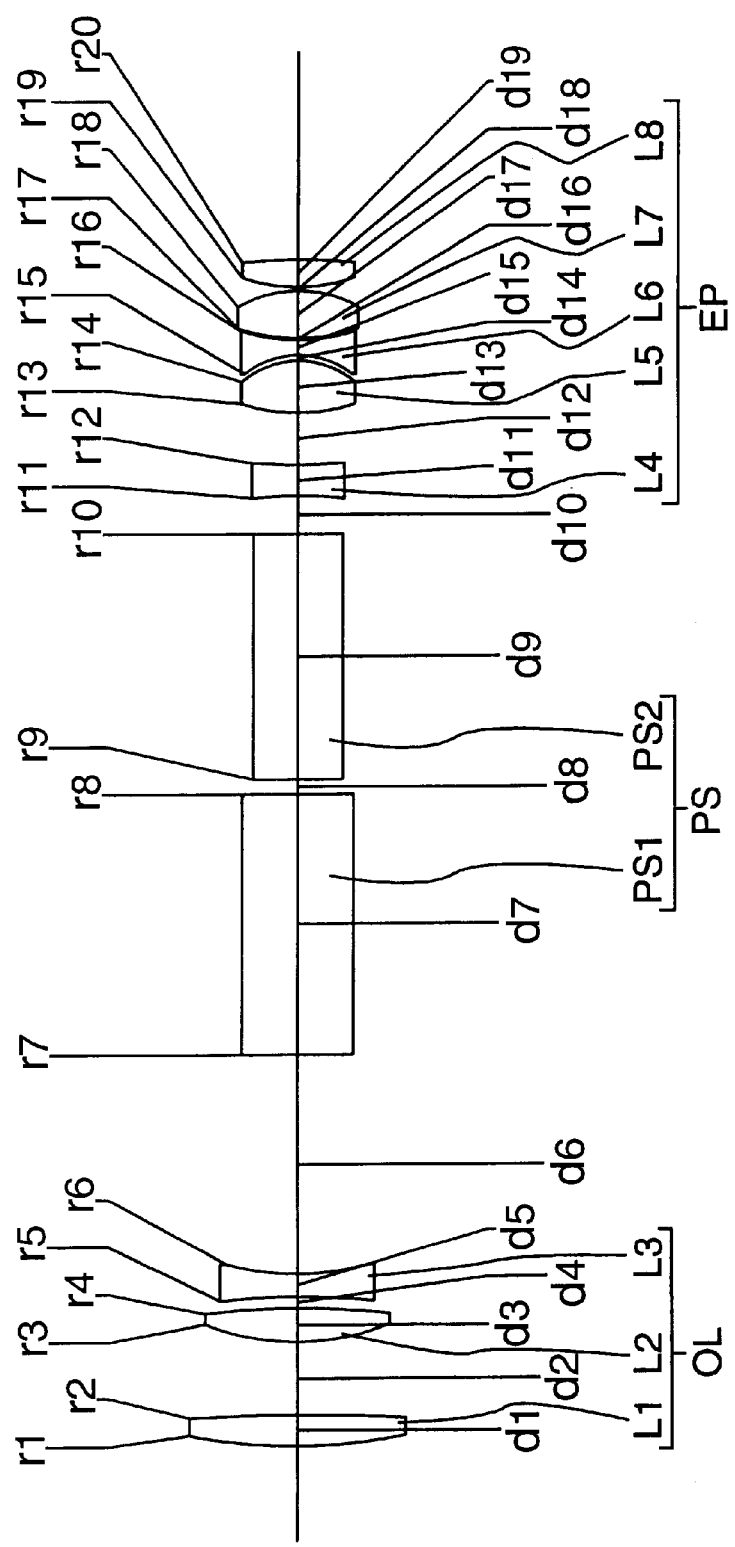
Figure 22:
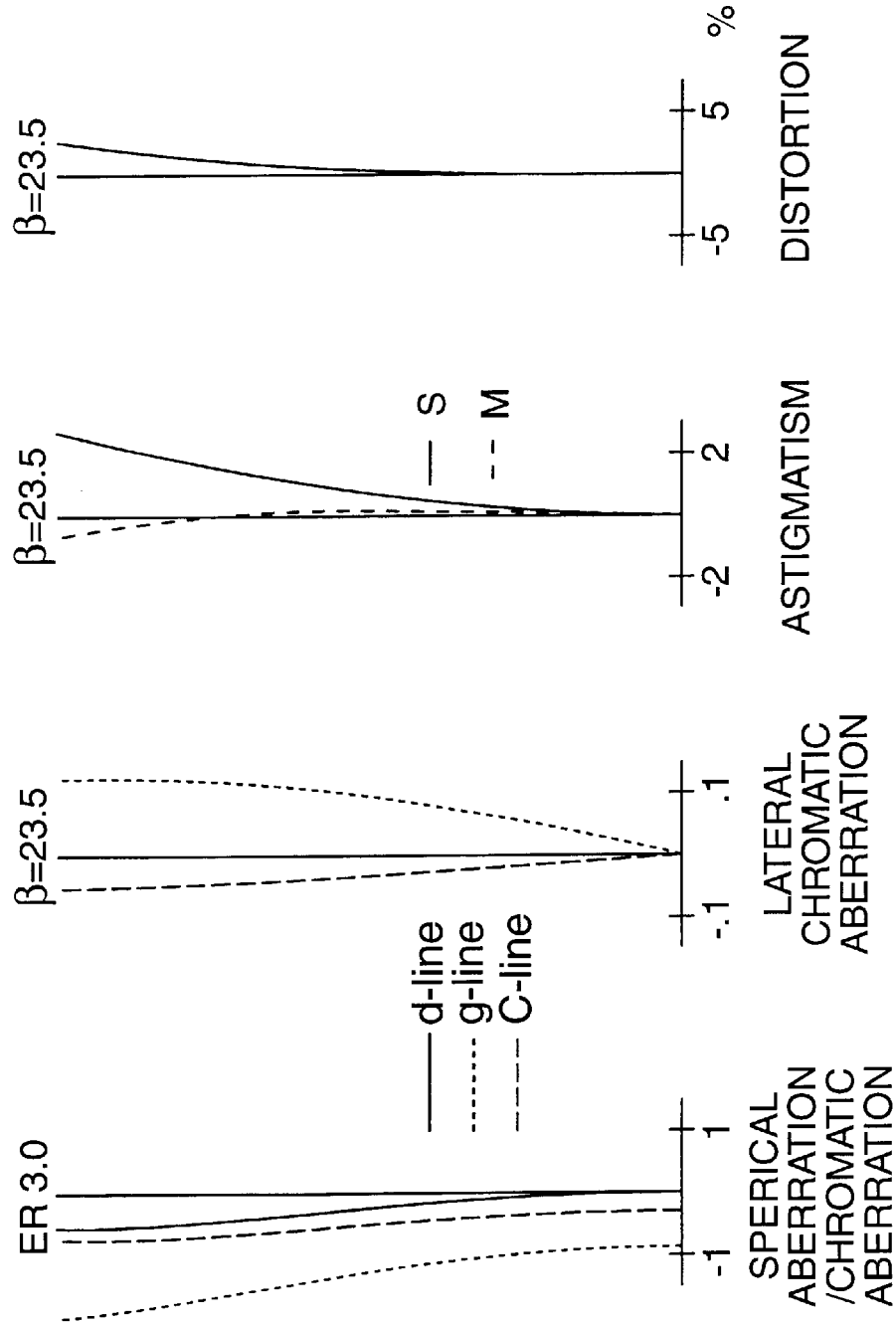
Figure 23:
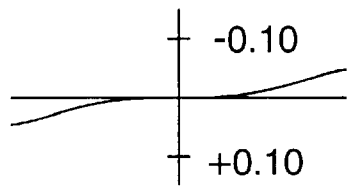
Figure 24:
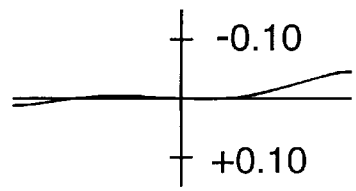
Figure 27:
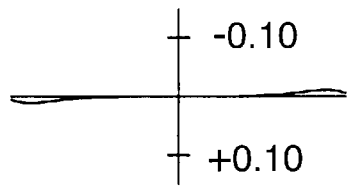
Figure 28:
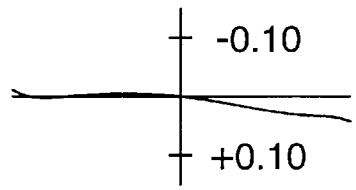
Figure 31:
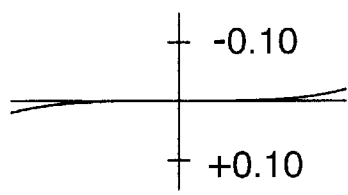
Figure 32:
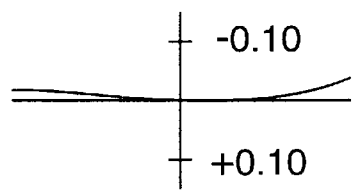
Figure 35:
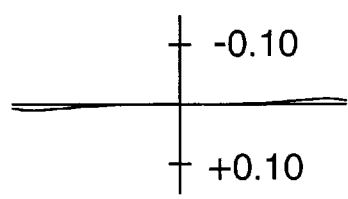
Figure 36:
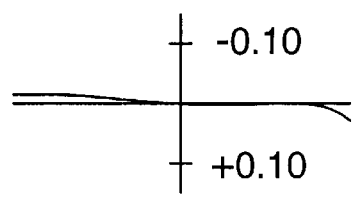
Figure 25:
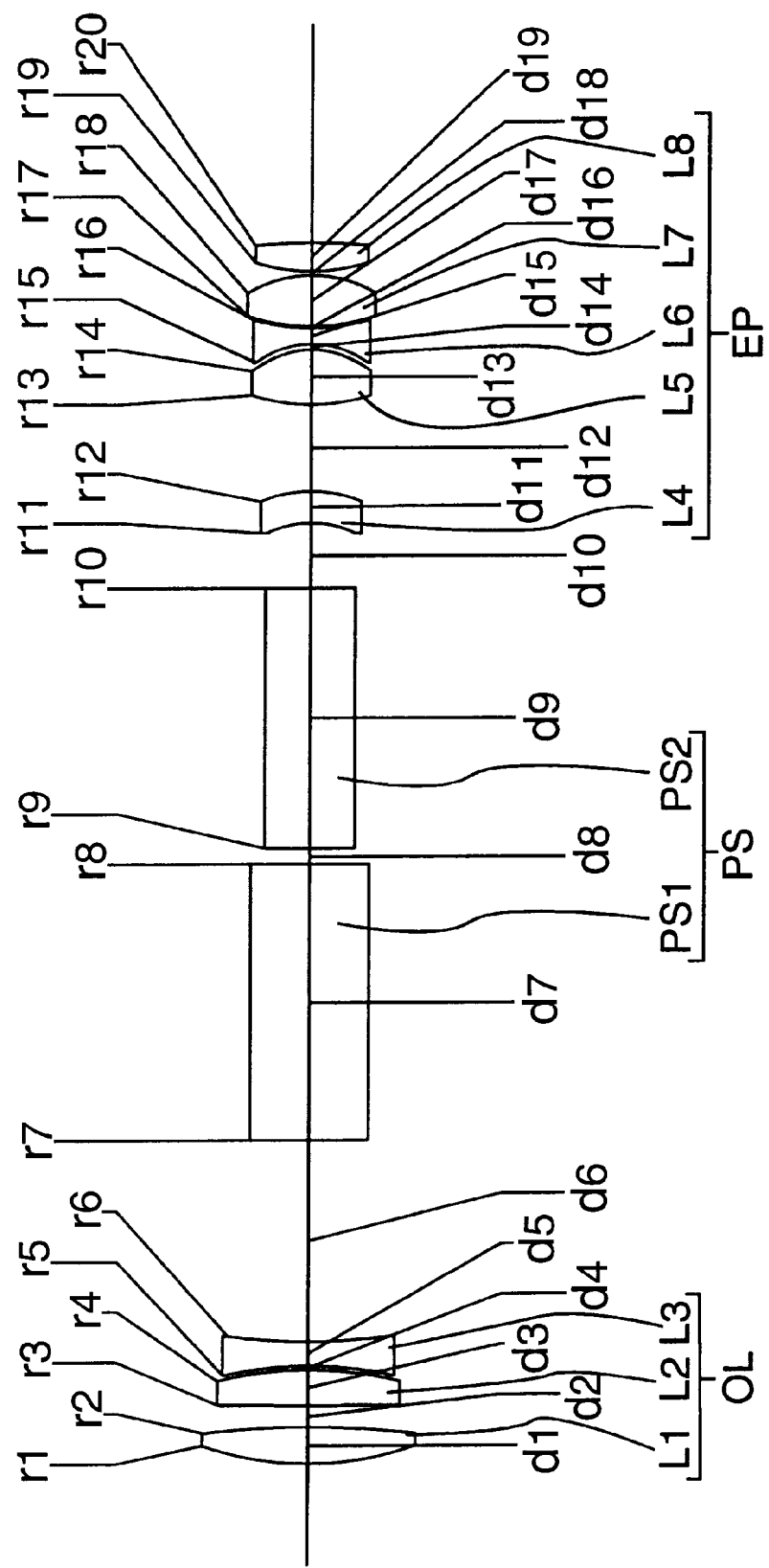
Figure 33:
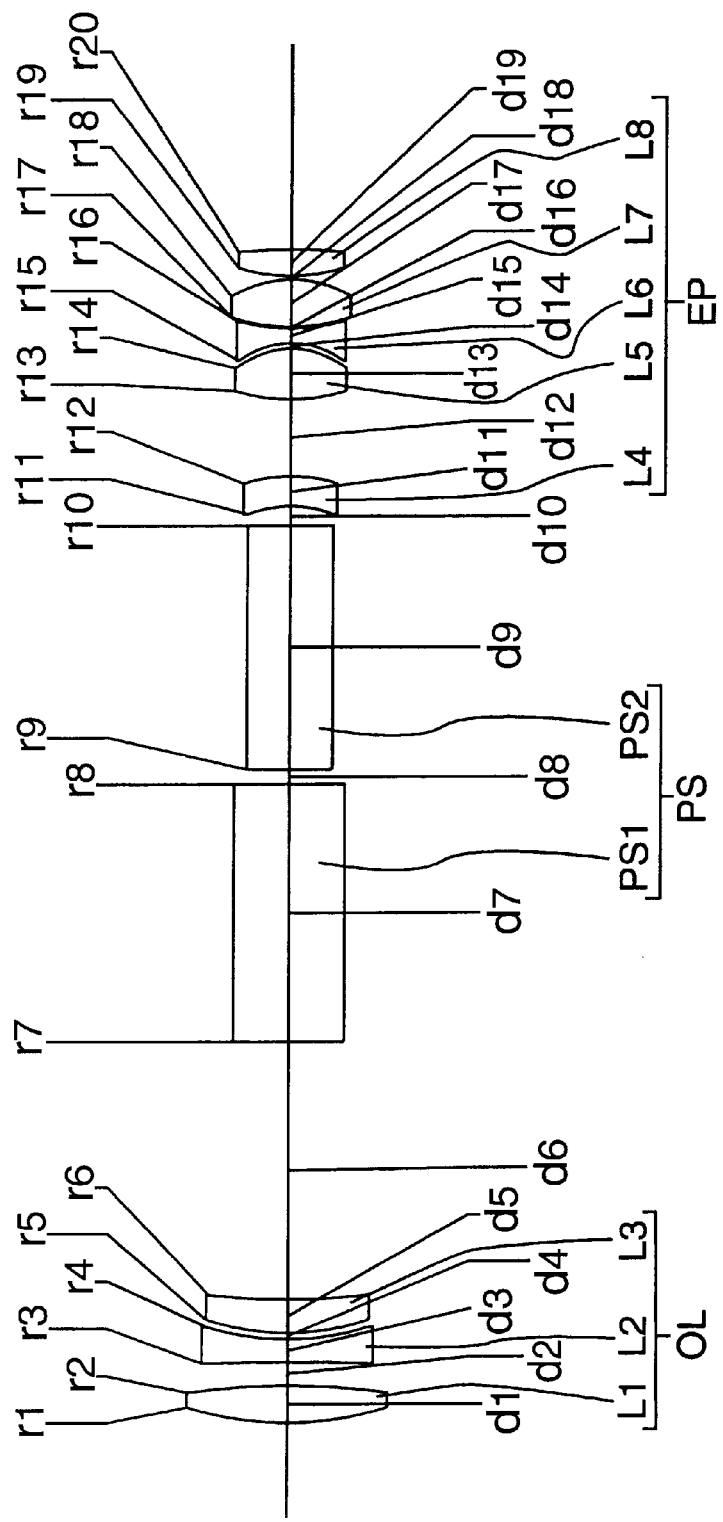
Figure 37:
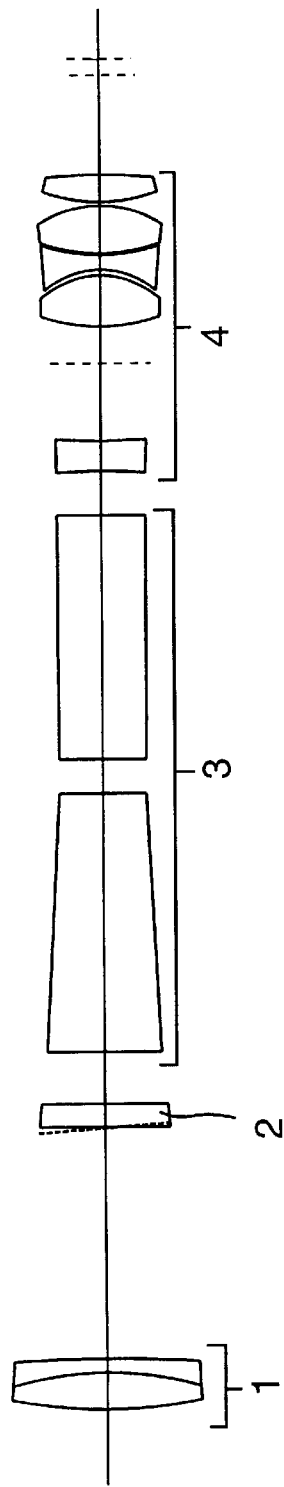
Figure 39:
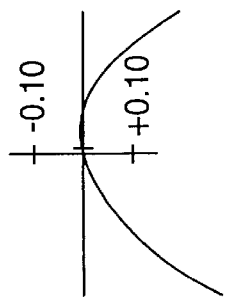
Figure 38:
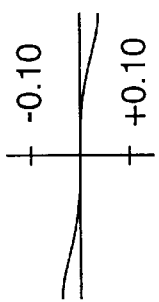

FIG. 3 schematically shows a structure of the driving mechanism shown in FIG. 1;

FIG. 4 is a block diagram illustrating a control system for controlling the driving mechanism;

FIG. 5 is a lens diagram showing a telescopic optical system according to a first embodiment;

FIGS. 6A through 6D show various aberrations of the telescopic optical system shown in FIG. 5;

FIG. 7 shows axial coma of the telescopic optical system shown in FIG. 5 when any lenses are not decentered;

FIG. 8 shows axial coma of the telescopic optical system shown in FIG. 5 when the first lens is decentered to stabilize an image when a tilt angle is 1 degree;

FIG. 9 is a lens diagram showing a telescopic optical system according to a second embodiment;

FIGS. 10A through 10D show various aberrations of the telescopic optical system shown in FIG. 9;

FIG. 11 shows axial coma of the telescopic optical system shown in FIG. 9 when any lenses are not decentered;

FIG. 12 shows axial coma of the optical system shown in FIG. 9 when the first lens is decentered to stabilize an image when the tilt angle is 1 degree;

FIG. 13 is a lens diagram showing a telescopic optical system according to a third embodiment;

FIGS. 14A through 14D show various aberrations of the telescopic optical system shown in FIG. 13;

FIG. 15 shows axial coma of the telescopic optical system shown in FIG. 13 when any lenses are not decentered;

FIG. 16 shows axial coma of the optical system shown in FIG. 13 when the second lens is decentered to stabilize an image when the tilt angle is 1 degree;

FIG. 17 is a lens diagram showing a telescopic optical system according to a fourth embodiment;

FIGS. 18A through 18D show various aberrations of the telescopic optical system shown in FIG. 17;

FIG. 19 shows axial coma of the telescopic optical system shown in FIG. 17 when any lenses are not decentered;

FIG. 20 shows axial coma of the optical system shown in FIG. 17 when the first lens is decentered to stabilize an image when the tilt angle is 1 degree;

FIG. 21 is a lens diagram showing a telescopic optical system according to a fifth embodiment;

FIGS. 22A through 22D show various aberrations of the telescopic optical system shown in FIG. 21;

FIG. 23 shows axial coma of the telescopic optical system shown in FIG. 21 when any lenses are not decentered;

FIG. 24 shows axial coma of the optical system shown in FIG. 21 when the first lens is decentered to stabilize an image when the tilt angle is 1 degree;

FIG. 25 is a lens diagram showing a telescopic optical system according to a sixth embodiment;

FIGS. 26A through 26D show various aberrations of the telescopic optical system shown in FIG. 25;

FIG. 27 shows axial coma of the telescopic optical system shown in FIG. 25 when any lenses are not decentered;

FIG. 28 shows axial coma of the optical system shown in FIG. 25 when the first lens is decentered to stabilize an image when the tilt angle is 1 degree;

FIG. 29 is a lens diagram showing a telescopic optical system according to a seventh embodiment;

FIGS. 30A through 30D show various aberrations of the telescopic optical system shown in FIG. 29;

FIG. 31 shows axial coma of the telescopic optical system shown in FIG. 29 when any lenses are not decentered;

FIG. 32 shows axial coma of the optical system shown in FIG. 29 when the first lens is decentered to stabilize an image when the tilt angle is 1 degree;

FIG. 33 is a lens diagram showing a telescopic optical system according to a eighth embodiment;

FIGS. 34A through 34D show various aberrations of the telescopic optical system shown in FIG. 33;

FIG. 35 shows axial coma of the telescopic optical system shown in FIG. 33 when any lenses are not decentered;

FIG. 36 shows axial coma of the optical system shown in FIG. 33 when the first lens is decentered to stabilize an image when the tilt angle is 1 degree;

FIG. 37 is a lens diagram showing a telescopic optical system of a conventional binocular that employs a variable angle prism;

FIG. 38 shows axial coma of the telescopic optical system shown in FIG. 37 when the vertex angle of the variable angle prism is zero degrees; and FIG. 39 shows axial coma of the optical system shown in FIG. 37 when the variable angle prism is angled to stabilize an image when the tilt angle is 1 degree.

DESCRIPTION OF THE EMBODIMENTS

Figure 2:
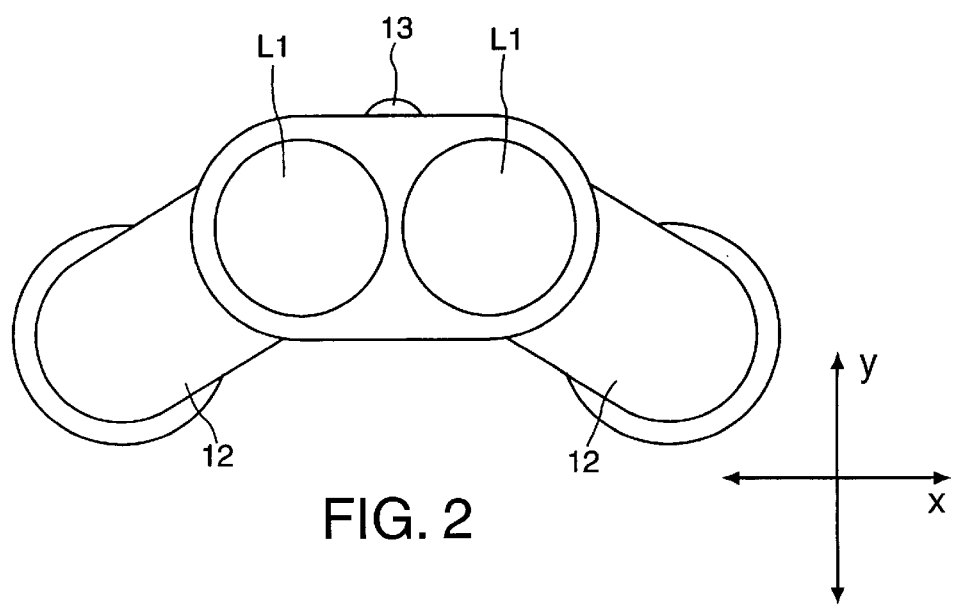
FIG. 2 is a front view of the binocular shown in FIG. 1.

FIG. 1 shows a binocular 10 that employs a pair of telescopic optical systems according to the invention. The binocular 10 also employs an image-vibration compensation system. FIG. 2 shows a front view of the binocular 10. The binocular 10 includes a center body 11 and a pair of grip portions 12 that are connected to the center body 11 at right and left side thereof, respectively. The grip portions 12 are rotatable with respect to the center body 11 in order to adjust a distance therebetween to fit a pupil distance of a user. A diopter adjusting dial 13 is attached to a rear portion of the center body 11.

The binocular 10 is provided with right and left telescopic optical systems arranged side by side for right and left eyes of the user. Since the left telescopic optical system is symmetric to the right telescopic optical system, FIG. 1 shows elements included in the right telescopic optical system, and description is directed thereto. The telescopic optical system of a first embodiment (described below) is employed in the binocular in FIG. 1.

The telescopic optical system consists of an objective optical system OL for forming an image of an object, an erecting system PS for erecting the image, and an eyepiece EP as an observing optical system for observing the image formed by the objective optical system OL and erected by the erecting system PS.

The objective optical system OL, which is provided in the center body 11, includes: a first lens L1 having positive refractive power; a second lens L2; and a third lens L3. The first, second and third lenses L1, L2 and L3 are arranged in this order from an object side. At least one lens surface of the first lens L1 is an aspherical surface. Further, one of the second and third lenses L2 and L3 has positive refractive power, and the other has negative refractive power. In this embodiment, the second lens L2 is a positive lens and the third lens L3 is a negative lens. The second and third lenses L2 and L3 are cemented together.

The first lens L1 is mounted on a driving mechanism 17 that moves the first lens L1 in directions orthogonal to an optical axis O of the objective optical system OL.

The objective optical system OL forms an inverted image, and the inverted image is erected into proper orientation through the erecting system PS. The erecting system PS is provided with a first prism PS1 and a second prism PS2, which constitute type II Porro prism system. The first prism PS1 has two reflection surfaces for rotating the image by 90 degrees, and the second prism PS2 also has two reflection surfaces for further rotating the image by 90 degrees.

The eyepiece EP has five lenses L4–L8 though which a user observes the erected image by the erecting system PS. The objective optical system OL and the first prism PS1 is arranged in the center body 11, and the second prism PS2 and the eyepiece EP are arranged in the grip portion 12.

The grip portion 12 is rotatable, with respect to the center body 11, about the optical axis O of the objective optical system OL. The erecting system PS and the eyepiece EP are rotated together with the grip portion 12. The left and right grip portions rotate in the opposite directions, and the user can adjust the distance between the left and right eyepieces to correspond to the pupil distance of the user.

In this specification, an x-axis direction and a y-axis direction are defined with respect to the binocular 10. The y-axis direction is defined as a direction that is perpendicular to a plane including the optical axes O of both the right and left telescopic optical systems. The x-axis direction is defined as a direction, which is parallel to a plane perpendicular to the optical axis O, and is perpendicular to the y-axis direction. Thus, the x-axis and y-axis are perpendicular to each other, and both are perpendicular to the optical axis O.

The driving mechanism 17 drives the first lens L1 in the x-axis and y-axis directions such that the image viewed by a user is stabilized even when a hand-held shake is applied to the binocular 10.

At the initial or neutral position of the first lens L1, the optical axis of the first lens L1 is coincident with the optical axis O of the second and third lenses L2 and L3.

When the object side of the binocular 10 moves, relatively to the eyepiece side, in the y-axis direction due to a hand-held shake, the driving mechanism 17 moves the first lens L1 in the y-axis direction so that a position of an image is maintained. Similarly, when the object side of the binocular 10 moves, relatively to the eyepiece side, in the x-axis direction due to the hand-held shake, the driving mechanism 17 moves the first lens L1 in the x-axis direction so that the image position is maintained. In this specification, the angle formed between the optical axes O before and after the binocular 10 has been moved in the y-axis direction is referred to as a tilt angle in the y-axis direction, and the angle formed between the optical axes O before and after the binocular 10 has been moved in the x-axis direction is referred to as a tilt angle in the x-axis direction. It should be noted that the hand-held shake applied to the binocular 10 can be represented by the tilt angle(s) in the x-axis and/or y-axis directions, and accordingly, the image can be stabilized by moving the first lens L1 in the x-axis and/or y-axis direction.

FIG. 3 shows an example of the driving mechanism 17 for driving the first lens L1.

The driving mechanism 17 includes a rectangular lens frame 51 that holds the first lenses L1 of both the telescopic optical systems at openings formed thereon, a first actuator 55 for linearly shifting the rectangular lens frame 51 in the y-axis direction and a second actuator 58 for linearly shifting the frame 51 in the x-axis direction.

At longitudinal side ends of the lens frame 51, a pair of guide bars 52 and 52 are provided. The guide bar 52 has a center bar 52a and edge bars 52b formed at both edges of the center bar 52a. Both of the edge bars 52b are perpendicular to the center bar 52a and are directed to the same direction. The guide bars 52 and 52 are arranged such that the center bars 52a and 52a are parallel to the y-axis and that the tip ends of the edge bars 52b and 52b are directed to the rectangular lens frame 51.

The center bars 52a and 52a of the guide bars 52 and 52 are slidably fitted in through-holes formed in a pair of supports 53 and 53 that are formed inside a body 101 of the binocular.

The tip ends of the edge bars 52b of the one guide bars 52 are slidably inserted into holes 51a and 51a formed at one side end of the rectangular lens frame 51. The tip ends of the edge bars 52b of the other guide bars 52 are slidably inserted into holes 51a and 51a formed at the opposite side end of the rectangular lens frame 51.

With this structure, the lens frame 51 is movable in the y-axis direction and in the x-axis direction.

The first and second actuators 55 and 58 are secured on the inner surface of the body 101 of the binocular. A plunger 55a of the first actuator 55 is capable of protruding/retracting in the y-axis direction. The plunger 55a abuts a projection 54 formed on the lens frame 51 between the pair of first lenses L1. Further, coil springs 56 and 56 are provided to the center bars 52a and 52a to bias the lens frame 51 in the upward direction in FIG. 3 with respect to the body 101 of the binocular.

A plunger 58a of the second actuator 58 is capable of protruding/retracting in the x-axis direction. The plunger 58a abuts a projection 57 formed on the side of the lens frame 51. The coil springs 59 and 59 are provided to the edge bars 52b and 52b of the one guide bar 52 to bias the lens frame 51 in the rightward direction in FIG. 3.

When electrical power is applied to the first actuator 55 to make the plunger 55a protrude, the plunger 55a pushes the projection 54 to linearly move the rectangular lens frame 51 in the downward direction in FIG. 3. When the electrical power for retracting the plunger 55a is applied to the actuator 55, due to force of the coil springs 56, the projection 54 is kept contacting the plunger 55a, i.e., the lens frame 51 moves in the upward direction in FIG. 3.

In the same manner, when the electrical power is applied to the second actuator 58 to make the plunger 58a protrude, the projection 57 is pushed to linearly move the rectangular lens frame 51 in the leftward direction in FIG. 3. When the electrical power for retracting the plunger 58a is applied, the lens frame 51 moves in the rightward direction in FIG. 3 due to force of the coil springs 59 and 59.

When the first lens L1 is moved in the y-axis direction, the image in the user view moves in the vertical (up/down) direction. Accordingly, by controlling the first actuator 55, the vertical movement of the image due to the vertical hand-held shake can be compensated, while by controlling the second actuator 58, the horizontal movement of the image due to the horizontal hand-held shake can be compensated.

Further, the driving mechanism 17 is provided with an x-direction position sensor 221 and a y-direction position sensor 227 that are also secured to the body 101 of the binocular. The position sensor may be an optical sensor having a light emitting element and a position sensitive device (PSD).

As shown in FIG. 4, the first and second actuators 55 and 58 are controlled by a controller 233 through drivers 222 and 228, respectively. The controller 233 controls the drivers 222 and 228 based on the signals from a vertical hand-held shake sensor 150V, a horizontal hand-held shake sensor 150H, the x-direction position sensor 221, and the y-direction position sensor 227.

The controller 233 calculates amount of movements of the binocular in the vertical and horizontal directions due to the hand-held shake, and controls the drivers 222 and 228 to drive the first and second actuators 55 and 58 by an amount corresponding to the amount of movement of the image due to the hand-held shake. Specifically, the controller 233 determines a target position to which the lens frame 51 is to be positioned for canceling change of the position of the image due to the hand-held shake based on the amount of movement detected by the hand-held shake sensors 150V and 150H. Then, the controller 233 controls the driver to move the lens frame 51 to the calculated target position with monitoring the position detected by the position sensors 221 and 227. As the above control is continuously executed, the controller 233 continuously updates the target position, and accordingly, the image vibration due to the hand-held shake is compensated.

According to the embodiment, the telescopic optical system satisfies conditions (1), (2) and (3):

$$0.5 < |(\tan 1°)/\phi_1| < 5.0 \text{ (unit:mm)} \tag{1}$$

$$|\phi_{23}/\phi_{13}| < 1.00 \tag{2}$$

$$1.0 < hi/hx < 1.5 \tag{3}$$

where, $\phi_1$ is a refractive power of the first lens, $\phi_{23}$ is a composite refractive power of the second and third lenses, $\phi_{13}$ is a composite refractive power of the objective optical system, hi is a height from an optical axis of an intersecting point of a paraxial axial ray on the object side surface of the second lens (hi≠0), and hx is a height from an optical axis of an intersecting point of the paraxial axial ray on the erecting system side surface of the third lens.

Condition (1) defines a range of a decentering sensitivity, which is defined as a decentering amount of the first lens L1 to stabilize an image when the tilt angle of the optical system is 1 degree. The sensitivity of decentering of a lens means effect on an image (i.e. change of position of an image and/or change of aberrations) when the lens is decentering by a predetermined amount. The larger the sensitivity is, the larger the effect is.

If condition (1) is satisfied, the decentering sensitivity of the first lens L1 falls within a suitable range for compensating the trembling of the image due to the hand-held shake. If the ratio is smaller than the lower limit, the decentering sensitivity is too large to control. If the ratio is larger than the upper limit, the decentering sensitivity is too small, which increases the size of the driving mechanism and increases the driving amount of the first lens L1.

The condition (2) defines a ratio of the composite power of the second and third lenses L2 and L3 to the composite power of the objective optical system OL. The smaller the ratio is, the easier the aberration correction is. If the condition (2) is satisfied, aberrations can be easily corrected. If the ratio is larger than the upper limit, it becomes difficult to correct spherical aberration and coma.

The condition (3) defines an angular magnification when the second and third lenses are considered as an afocal optical system. If the condition (3) is satisfied, aberration is easily corrected. If the ratio is smaller than the lower limit, the third lens L3 becomes too large to make the objective optical system compact. If the ratio is larger than the upper limit, the difference between the heights hi and hx becomes so large that it is difficult to correct spherical aberration, axial chromatic aberration and lateral chromatic aberration.

In the image-vibration compensation system of the lens decentering type, inertial mass of the compensation lens should be as small as possible to lower load for the driving mechanism. Thus, it is preferable that the compensation lens consists of a plastic lens that is light in weight as compared with a glass lens.

Further, a lens having large spherical aberration generates large decentering coma when the lens is decentered due to image-vibration compensation. Thus the spherical aberration of the compensation lens should be as small as possible. Since the compensation lens consists of a single lens (L1), it is preferable that the first lens L1 is an aspherical lens of which thickness at periphery is larger than a spherical lens having same axial radius of curvature in order to correct spherical aberration. From this viewpoint, the plastic lens is preferable because it is easy to form an aspherical surface by injection molding.

The second and third lenses L2 and L3 may be cemented together. In such a case, the condition (4) is preferably satisfied:

$$-0.3 < \phi_4/\phi_{13} < 0.0 \tag{4}$$

where, $\phi_4$ is a refractive power of the cemented surface of the second and third lenses.

Since the power $\phi_{13}$ has positive value, if the ratio is larger than the upper limit of the condition (4), the power $\phi_4$ has positive value. In such a case, it is difficult to correct chromatic aberration in the objective optical system OL having positive refractive power as the whole. When $\phi_4$ is so small that the ratio is smaller than the lower limit of the condition (4), the curvature of the cemented surface becomes too large or the difference of the refractive indices between the second and third lenses becomes too large. The large curvature results difficult processing and easy exfoliation. The large difference between the refractive indices requires high index material, increasing cost of the objective optical system. When $\phi_{13}$ is so small that the ratio is smaller than the lower limit of the condition (4), the total length of the objective optical system becomes too long.

On the other hand, the second and third lenses L2 and L3 may be independently arranged without being cemented. In such a case, the condition (5) is preferably satisfied:

$$D_{23}/f_{13} < 0.2 \tag{5}$$

where, $D_{23}$ is a distance between the object side surface of the second lens and the erecting system side surface of the third lens, and $f_{13}$ is a focal length of the objective optical system.

The condition (5) defines a distance between the second and third lenses L2 and L3 of the objective optical system OL as compared with the focal length of the objective optical system OL. If the condition (5) is satisfied, sensitivity of decentering and/or sensitivity of inclination becomes small, it allows easy (not so accurate) producing and assembling of a lens. If the ratio is larger than upper limit of the condition (5), the sensitivity becomes so large that the accurate producing and assembling are required, which increases cost of the device.

[Numerical Embodiments]

Hereafter, numerical embodiments of the telescopic optical systems will be described with reference to FIGS. 5 through 36.

[First Embodiment]

FIG. 5 shows a telescopic optical system according to a first embodiment and the numerical construction thereof is described in TABLE 1. The objective optical system OL includes the positive first lens L1, the positive second lens L2 and the negative third lens L3. The first lens L1 is a compensation lens, and the second and third lenses L2 and L3 are cemented together. The first lens L1 is a plastic lens having an aspherical surface. The prisms PS1 and PS2 of the erecting system PS are shown as plane parallel plates in FIG. 5. The eyepiece EP includes the negative fourth lens L4, the positive fifth lens L5, the negative sixth lens L6, the positive seventh lens L7 and the positive eighth lens L8.

In TABLE 1, ER denotes a diameter of an eye ring (mm), ω denotes a half view angle (degrees), Dpt denotes a diopter, r (mm) denotes a radius of curvature of a surface (the values at the vertex for aspherical surfaces), d (mm) denotes a distance between the surfaces along the optical axis, nd denotes a refractive index at a wavelength of 588 nm and ν denotes an Abbe number.

TABLE 1

ER = 3.01   ω = −3.1   Dpt = −1.00

| Surface Number | r | d | nd | ν |
|---|---|---|---|---|
| 1 | 123.795 | 4.000 | 1.49176 | 57.4 |
| 2 | −128.557 | 2.990 | | |
| 3 | 36.410 | 4.000 | 1.51633 | 64.1 |
| 4 | −253.853 | 2.000 | 1.62004 | 36.3 |
| 5 | 49.801 | 28.490 | | |
| 6 | INFINITY | 34.000 | 1.56883 | 56.3 |
| 7 | INFINITY | 2.000 | | |
| 8 | INFINITY | 32.000 | 1.56883 | 56.3 |
| 9 | INFINITY | 4.910 | | |
| 10 | −15.241 | 4.000 | 1.49176 | 57.4 |
| 11 | −26.686 | 14.360 | | |
| 12 | 23.936 | 6.770 | 1.49176 | 57.4 |
| 13 | −10.075 | 0.700 | | |
| 14 | −11.190 | 2.000 | 1.58547 | 29.9 |
| 15 | 25.294 | 0.200 | | |
| 16 | 24.157 | 6.200 | 1.49176 | 57.4 |
| 17 | −15.260 | 0.500 | | |
| 18 | 22.703 | 3.500 | 1.60311 | 60.7 |
| 19 | −75.123 | — | | |

The surfaces whose numbers are 1, 10 and 13 are aspherical surfaces. An aspherical surface is expressed by the following equation:

$$X(h) = \frac{h^2 C}{1 + \sqrt{1 - (1+K)h^2 C^2}} + A_4 h^4 + A_6 h^6 + A_8 h^8$$

where, X(h) is a SAG, that is, a distance of a curve from a tangential plane at a point on the surface where the height from the optical axis is h. C is a curvature (1/r) of the vertex of the surface, K is a conic constant, $A_4$, $A_6$ and $A_8$ are aspherical surface coefficients of fourth, sixth and eighth orders. The constant K and coefficients $A_4$, $A_6$ and $A_8$ are indicated in TABLE 2.

TABLE 2

| NO. 1 | K = 0.00 | A4 = −0.2456 × 10⁻⁶ | A6 = 0.0000 | A8 = 0.0000 |
|---|---|---|---|---|
| NO. 10 | K = 0.00 | A4 = 0.4333 × 10⁻⁴ | A6 = 0.7412 × 10⁻⁶ | A8 = 0.0000 |
| NO. 13 | K = −1.00 | A4 = −0.4600 × 10⁻⁵ | A6 = 0.0000 | A8 = 0.0000 |

FIGS. 6A through 6D show third order aberrations of the telescopic optical system according to the first embodiment:

FIG. 6A shows spherical aberrations at d-line (588 nm), g-line (436 nm) and C-line (656 nm);

FIG. 6B shows a lateral chromatic aberration at the same wavelengths as in FIG. 6A;

FIG. 6C shows an astigmatism (S: Sagittal, M: Meridional); and

FIG. 6D shows distortion.

The vertical axis in FIG. 6A represents the diameter of the eye ring, and the vertical axes in FIGS. 6B through 6D respectively represent an angle β formed between the exit ray from the eyepiece and the optical axis. Unit of the horizontal axis is "mm" in each of FIGS. 6A through 6C, and is "percent" in FIG. 6D.

FIG. 7 is a graph showing the axial coma of the telescopic optical system of the first embodiment when the first lens L1 is not decentered, FIG. 8 is a graph showing the axial coma where the first lens L1 is decentered by 2.25 mm to stabilize the image when the tilt angle due to the hand-held shake is 1 degree. According to the first embodiment, coma can be made smaller, even when the first lens L1 is decentered, than the conventional compensation system using a variable angle prism.

[Second Embodiment]

FIG. 9 shows an optical system according to a second embodiment. The numerical construction of the second embodiment is described in TABLE 3. The objective optical system OL includes three lenses L1 through L3. The first lens L1 is a compensation lens, and the positive second L2 and the negative third lens L3 are cemented together.

TABLE 3

ER = 3.08   ω = −3.1   Dpt = −1.02

| Surface Number | r | d | nd | ν |
|---|---|---|---|---|
| 1 | 107.873 | 3.500 | 1.52580 | 0.0 |
| 2 | −184.595 | 40.360 | | |
| 3 | 19.149 | 6.000 | 1.51633 | 64.1 |
| 4 | −69.050 | 3.550 | 1.62004 | 36.3 |
| 5 | 17.700 | 11.070 | | |
| 6 | INFINITY | 34.000 | 1.56883 | 56.3 |
| 7 | INFINITY | 2.000 | | |
| 8 | INFINITY | 32.000 | 1.56883 | 56.3 |
| 9 | INFINITY | 5.540 | | |
| 10 | 8.643 | 4.000 | 1.58547 | 29.9 |
| 11 | 7.471 | 12.250 | | |
| 12 | 23.936 | 6.770 | 1.49176 | 57.4 |
| 13 | −10.075 | 0.700 | | |
| 14 | −11.190 | 2.000 | 1.58547 | 29.9 |
| 15 | 25.294 | 0.200 | | |
| 16 | 24.157 | 6.200 | 1.49176 | 57.4 |
| 17 | −15.260 | 0.500 | | |
| 18 | 22.703 | 3.500 | 1.60311 | 60.7 |
| 19 | −75.123 | — | | |

The surfaces whose numbers are 1, 10 and 13 are aspherical surfaces. The constant K and coefficients $A_4$, $A_6$ and $A_8$ are shown in TABLE 4.

TABLE 4

| NO. 1 | K = 0.00 | A4 = −0.1800 × 10⁻⁶ | A6 = 0.6000 × 10⁻¹⁰ | A8 = 0.0000 |
|---|---|---|---|---|
| NO. 10 | K = 0.00 | A4 = −0.4490 × 10⁻⁵ | A6 = −0.6070 × 10⁻⁷ | A8 = −0.1050 × 10⁻⁷ |
| NO. 13 | K = −1.00 | A4 = −0.4600 × 10⁻⁵ | A6 = 0.0000 | A8 = 0.0000 |

FIGS. 10A through 10D show third order aberrations of the telescopic optical system according to the second embodiment. FIG. 11 is a graph showing the axial coma of the telescopic optical system of the second embodiment when the first lens L1 is not decentered. FIG. 12 is a graph showing the axial coma when the first lens L1 is decentered by 2.27 mm to stabilize the image when the tilt angle is 1 degree. In the second embodiment, coma can be made smaller than the conventional compensation system.

[Third Embodiment]

FIG. 13 shows an optical system according to a third embodiment, and the numerical construction thereof is indicated in TABLE 5. The objective optical system OL includes three lenses L1 through L3. The first lens L1 is a compensation lens, and the positive second L2 and the negative third lens L3 are cemented together.

TABLE 5

ER = 2.76  ω = −3.1  Dpt = −1.02

| Surface Number | r | d | nd | ν |
|---|---|---|---|---|
| 1 | −1408.630 | 4.000 | 1.49176 | 57.4 |
| 2 | −104.481 | 2.000 | | |
| 3 | 36.797 | 4.700 | 1.51633 | 64.1 |
| 4 | −107.691 | 2.000 | 1.62004 | 36.3 |
| 5 | 86.890 | 23.770 | | |
| 6 | INFINITY | 34.000 | 1.56883 | 56.3 |
| 7 | INFINITY | 2.000 | | |
| 8 | INFINITY | 32.000 | 1.56883 | 56.3 |
| 9 | INFINITY | 4.330 | | |
| 10 | −7.613 | 4.000 | 1.49176 | 57.4 |
| 11 | −10.236 | 19.030 | | |
| 12 | 23.936 | 6.770 | 1.49176 | 57.4 |
| 13 | −10.075 | 0.700 | | |
| 14 | −11.190 | 2.000 | 1.58547 | 29.9 |
| 15 | 25.294 | 0.200 | | |
| 16 | 24.157 | 6.200 | 1.49176 | 57.4 |
| 17 | −15.260 | 0.500 | | |
| 18 | 22.703 | 3.500 | 1.60311 | 60.7 |
| 19 | −75.123 | — | | |

The surface whose numbers are 1, 10 and 13 are aspherical surfaces. The constant K and coefficients $A_4$, $A_6$ and $A_8$ are shown in TABLE 6.

TABLE 6

| NO. 1 | K = 0.00 | $A_4$ = −0.1582 × $10^{-6}$ | $A_6$ = 0.0000 | $A_8$ = 0.0000 |
|---|---|---|---|---|
| NO. 10 | K = 0.00 | $A_4$ = 0.1244 × $10^{-3}$ | $A_6$ = 0.2745 × $10^{-5}$ | $A_8$ = 0.0000 |
| NO. 13 | K = −1.00 | $A_4$ = −0.4600 × $10^{-5}$ | $A_6$ = 0.0000 | $A_8$ = 0.0000 |

FIGS. 14A through 14D show third order aberrations of the telescopic optical system according to the third embodiment. FIG. 15 is a graph showing the axial coma of the telescopic optical system of the third embodiment when the first lens L1 is not decentered, and FIG. 16 is a graph showing the axial coma when the first lens L1 is decentered by 4.00 mm to stabilize the image when the tilt angle is 1 degree. In the third embodiment, coma can be made smaller than the conventional compensation system.

[Fourth Embodiment]

FIG. 17 shows an optical system according to a fourth embodiment, and the numerical construction thereof is indicated in TABLE 7. The objective optical system OL includes three lenses L1 through L3. The first lens L1 is a compensation lens, and the negative second L2 and the positive third lens L3 are cemented together.

TABLE 7

ER = 2.94  ω = −3.1  Dpt = −1.01

| Surface Number | r | d | nd | ν |
|---|---|---|---|---|
| 1 | 53.606 | 4.000 | 1.49176 | 57.4 |
| 2 | −951.902 | 20.530 | | |
| 3 | −214.616 | 2.000 | 1.62004 | 36.3 |
| 4 | 38.497 | 4.000 | 1.51633 | 64.1 |
| 5 | −94.013 | 14.370 | | |
| 6 | INFINITY | 34.000 | 1.56883 | 56.3 |
| 7 | INFINITY | 2.000 | | |
| 8 | INFINITY | 32.000 | 1.56883 | 56.3 |
| 9 | INFINITY | 16.300 | | |
| 10 | −15.843 | 4.000 | 1.49176 | 57.4 |
| 11 | −56.065 | 6.830 | | |
| 12 | 23.936 | 6.770 | 1.49176 | 57.4 |
| 13 | −10.075 | 0.700 | | |
| 14 | −11.190 | 2.000 | 1.58547 | 29.9 |
| 15 | 25.294 | 0.200 | | |
| 16 | 24.157 | 6.200 | 1.49176 | 57.4 |
| 17 | −15.260 | 0.500 | | |
| 18 | 22.703 | 3.500 | 1.60311 | 60.7 |
| 19 | −75.123 | — | | |

The surfaces whose numbers are 1, 10 and 13 are aspherical surfaces. The constant K and coefficients $A_4$, $A_6$ and $A_8$ are shown in TABLE 8.

TABLE 8

| NO. 1 | K = 0.00 | $A_4$ = −0.6270 × $10^{-6}$ | $A_6$ = 0.0000 | $A_8$ = 0.0000 |
|---|---|---|---|---|
| NO. 10 | K = 0.00 | $A_4$ = 0.1700 × $10^{-3}$ | $A_6$ = 0.0000 | $A_8$ = 0.0000 |
| NO. 13 | K = −1.00 | $A_4$ = −0.4600 × $10^{-5}$ | $A_6$ = 0.0000 | $A_8$ = 0.0000 |

FIGS. 18A through 18D show third order aberrations of the telescopic optical system according to the fourth embodiment. FIG. 19 is a graph showing the axial coma of the telescopic optical system of the fourth embodiment when the first lens L1 is not decentered, and FIG. 20 is a graph showing the axial coma when the first lens L1 is decentered by 1.80 mm to stabilize the image when the tilt angle is 1 degree. In the fourth embodiment, coma can be made smaller than the conventional compensation system.

[Fifth Embodiment]

FIG. 21 shows an optical system according to a fifth embodiment, and the numerical construction thereof is indicated in TABLE 9. The objective optical system OL includes three lenses L1 through L3. The first lens L1 is a compensation lens, and the positive second and the negative third lens L3 are independently arranged without being cemented.

TABLE 9

ER = 3.02  ω = −3.1  Dpt = −1.00

| Surface Number | r | d | nd | ν |
|---|---|---|---|---|
| 1 | 72.461 | 4.000 | 1.49176 | 57.4 |
| 2 | −247.767 | 9.470 | | |
| 3 | 32.000 | 4.368 | 1.51633 | 64.1 |
| 4 | −98.313 | 1.500 | | |
| 5 | −91.298 | 3.000 | 1.60342 | 38.0 |
| 6 | 33.823 | 28.958 | | |
| 7 | INFINITY | 34.000 | 1.56883 | 56.3 |
| 8 | INFINITY | 2.000 | | |
| 9 | INFINITY | 32.000 | 1.56883 | 56.3 |
| 10 | INFINITY | 5.000 | | |
| 11 | −56.954 | 4.000 | 1.49176 | 57.4 |
| 12 | 35.848 | 6.842 | | |
| 13 | 23.936 | 6.770 | 1.49176 | 57.4 |
| 14 | −10.075 | 0.700 | | |
| 15 | −11.190 | 2.000 | 1.58547 | 29.9 |
| 16 | 25.294 | 0.200 | | |
| 17 | 24.157 | 6.200 | 1.49176 | 57.4 |
| 18 | −15.260 | 0.500 | | |
| 19 | 22.703 | 3.500 | 1.60311 | 60.7 |
| 20 | −75.123 | — | | |

The surfaces whose numbers are 2, 12 and 14 are aspherical surfaces. The constant K and coefficients $A_4$, $A_6$ and $A_8$ are shown in TABLE 10.

TABLE 10

| NO. 2 | K = 0.00 | A4 = 0.3748 × 10⁻⁶ | A6 = −0.7612 × 10⁻¹⁰ | A8 = 0.0000 |
|---|---|---|---|---|
| NO. 12 | K = 0.00 | A4 = −0.3447 × 10⁻³ | A6 = 0.3623 × 10⁻⁵ | A8 = 0.0000 |
| NO. 14 | K = −1.00 | A4 = −0.4600 × 10⁻⁵ | A6 = 0.0000 | A8 = 0.0000 |

FIGS. 22A through 22D show third order aberrations of the telescopic optical system according to the fifth embodiment. FIG. 23 is a graph showing the axial coma of the telescopic optical system of the fifth embodiment when the first lens L1 is not decentered, and FIG. 24 is a graph showing the axial coma when the first lens L1 is decentered by 2.00 mm to stabilize the image when the tilt angle is 1 degree. In the fifth embodiment, coma can be made smaller than the conventional compensation system.

[Sixth Embodiment]

FIG. 25 shows an optical system according to a sixth embodiment, and the numerical construction thereof is indicated in TABLE 11. The objective optical system OL includes three lens L1 through L3. The first lens L1 is a compensation lens, and the positive second L2 and the negative third lens L3 are independently arranged without being cemented.

TABLE 11

ER = 3.02  ω = −3.1  Dpt = −1.00

| Surface Number | r | d | nd | ν |
|---|---|---|---|---|
| 1 | 38.853 | 4.500 | 1.49176 | 57.4 |
| 2 | −99.683 | 2.650 | | |
| 3 | 1301.800 | 4.370 | 1.51633 | 64.1 |
| 4 | −45.801 | 0.500 | | |
| 5 | −46.568 | 3.000 | 1.60342 | 38.0 |
| 6 | 72.836 | 25.020 | | |
| 7 | INFINITY | 34.000 | 1.56883 | 56.3 |
| 8 | INFINITY | 2.000 | | |
| 9 | INFINITY | 32.000 | 1.56883 | 56.3 |
| 10 | INFINITY | 8.010 | | |
| 11 | −12.346 | 4.000 | 1.49176 | 57.4 |
| 12 | −17.374 | 10.790 | | |
| 13 | 23.936 | 6.770 | 1.49176 | 57.4 |
| 14 | −10.075 | 0.700 | | |
| 15 | −11.190 | 2.000 | 1.58547 | 29.9 |
| 16 | 25.294 | 0.200 | | |
| 17 | 24.157 | 6.200 | 1.49176 | 57.4 |
| 18 | −15.260 | 0.500 | | |
| 19 | 22.703 | 3.500 | 1.60311 | 60.7 |
| 20 | −75.123 | — | | |

The surfaces whose numbers are 2, 12 and 14 are aspherical surfaces. The constant K and coefficients $A_4$, $A_6$ and $A_8$ are shown in TABLE 12.

TABLE 12

| NO. 2 | K = 0.00 | A4 = 0.2520 × 10⁻⁵ | A6 = −0.2720 × 10⁻⁹ | A8 = 0.0000 |
|---|---|---|---|---|
| NO. 12 | K = 0.00 | A4 = −0.9816 × 10⁻⁴ | A6 = −0.4227 × 10⁻⁶ | A8 = 0.0000 |
| NO. 14 | K = −1.00 | A4 = −0.4600 × 10⁻⁵ | A6 = 0.0000 | A8 = 0.0000 |

FIGS. 26A through 26D show third order aberrations of the telescopic optical system according to the sixth embodiment. FIG. 27 is a graph showing the axial coma of the telescopic optical system of the sixth embodiment when the first lens L1 is not decentered, and FIG. 28 is a graph showing the axial coma when the first lens L1 is decentered by 1.00 mm to stabilize the image when the tilt angle is 1 degree. In the sixth embodiment, coma can be made smaller than the conventional compensation system.

[Seventh Embodiment]

FIG. 29 shows an optical system according to a seventh embodiment, and the numerical construction thereof is indicated in TABLE 13. The objective optical system OL includes three lenses L1 through L3. The first lens L1 is a compensation lens, and the positive second L2 and the negative third lens L3 are independently arranged without being cemented.

TABLE 13

ER = 3.03  ω = −3.1  Dpt = −1.02

| Surface Number | r | d | nd | ν |
|---|---|---|---|---|
| 1 | 78.016 | 4.000 | 1.49176 | 57.4 |
| 2 | −203.195 | 4.000 | | |
| 3 | 34.334 | 4.300 | 1.51633 | 64.1 |
| 4 | 402.644 | 7.650 | | |
| 5 | 3000.000 | 3.000 | 1.68893 | 31.1 |
| 6 | 33.120 | 29.670 | | |
| 7 | INFINITY | 34.000 | 1.56883 | 56.3 |
| 8 | INFINITY | 2.000 | | |
| 9 | INFINITY | 32.000 | 1.56883 | 56.3 |
| 10 | INFINITY | 3.050 | | |
| 11 | 17.679 | 4.000 | 1.52580 | 0.0 |
| 12 | 14.269 | 9.750 | | |
| 13 | 23.936 | 6.770 | 1.49176 | 57.4 |
| 14 | −10.075 | 0.700 | | |
| 15 | −11.190 | 2.000 | 1.58547 | 29.9 |
| 16 | 25.294 | 0.200 | | |
| 17 | 24.157 | 6.200 | 1.49176 | 57.4 |
| 18 | −15.260 | 0.500 | | |
| 19 | 22.703 | 3.500 | 1.60311 | 60.7 |
| 20 | −75.123 | — | | |

The surfaces whose numbers are 2, 12 and 14 are aspherical surfaces. The constant K and coefficients $A_4$, $A_6$ and $A_8$ are shown in TABLE 14.

TABLE 14

| | | | | |
|---|---|---|---|---|
| NO. 2 | K = 0.00 | A4 = 0.3480 × 10$^{-6}$ | A6 = −0.2210 × 10$^{-10}$ | A8 = 0.0000 |
| NO. 12 | K = 0.00 | A4 = −0.1060 × 10$^{-4}$ | A6 = −0.1670 × 10$^{-5}$ | A8 = 0.0000 |
| NO. 14 | K = −1.00 | A4 = −0.4600 × 10$^{-5}$ | A6 = 0.0000 | A8 = 0.0000 |

FIGS. 30A through 30D show third order aberrations of the telescopic optical system according to the seventh embodiment. FIG. 31 is a graph showing the axial coma of the telescopic optical system of the seventh embodiment when the first lens L1 is not decentered, and FIG. 32 is a graph showing the axial coma when the first lens L1 is decentered by 2.01 mm to stabilize the image when the tilt angle is 1 degree. In the seventh embodiment, coma can be made smaller than the conventional compensation system.

[Eighth Embodiment]

FIG. 33 shows an optical system according to an eighth embodiment, and the numerical construction thereof is indicated in TABLE 15. The objective optical system OL includes three lenses L1 through L3. The first lens L1 is a compensation lens, and the negative second L2 and the positive third lens L3 are independently arranged without being cemented.

TABLE 15

ER = 3.02   ω = −3.1   Dpt = −1.02

| Surface Number | r | d | nd | ν |
|---|---|---|---|---|
| 1 | 42.344 | 5.000 | 1.49176 | 57.4 |
| 2 | −81.790 | 3.080 | | |
| 3 | −377.934 | 3.000 | 1.60342 | 38.0 |
| 4 | 35.342 | 0.830 | | |
| 5 | 33.351 | 4.370 | 1.51633 | 64.1 |
| 6 | 85.138 | 34.340 | | |
| 7 | INFINITY | 34.000 | 1.56863 | 56.3 |
| 8 | INFINITY | 2.000 | | |
| 9 | INFINITY | 32.000 | 1.56883 | 56.3 |
| 10 | INFINITY | 2.550 | | |
| 11 | −15.677 | 4.000 | 1.49176 | 57.4 |
| 12 | −23.601 | 10.130 | | |
| 13 | 23.936 | 6.770 | 1.49176 | 57.4 |
| 14 | −10.075 | 0.700 | | |
| 15 | −11.190 | 2.000 | 1.58547 | 29.9 |
| 16 | 25.294 | 0.200 | | |
| 17 | 24.157 | 6.200 | 1.49176 | 57.4 |
| 18 | −15.260 | 0.500 | | |
| 19 | 22.703 | 3.500 | 1.60311 | 60.7 |
| 20 | −75.123 | — | | |

The surfaces whose numbers are 2, 12 and 14 are aspherical surfaces. The constant K and coefficients $A_4$, $A_6$ and $A_8$ are indicated in TABLE 16.

TABLE 16

| | | | | |
|---|---|---|---|---|
| NO. 2 | K = 0.00 | A4 = 0.2714 × 10$^{-5}$ | A6 = −0.8886 × 10$^{-9}$ | A8 = 0.0000 |
| NO. 12 | K = 0.00 | A4 = −0.1092 × 10$^{-3}$ | A6 = 0.0000 | A8 = 0.0000 |
| NO. 14 | K = −1.00 | A4 = −0.4600 × 10$^{-5}$ | A6 = 0.0000 | A8 = 0.0000 |

FIGS. 34A through 34D show third order aberrations of the telescopic optical system according to the eighth embodiment. FIG. 35 is a graph showing the axial coma of the telescopic optical system of the eighth embodiment when the first lens L1 is not decentered, and FIG. 36 is a graph showing the axial coma when the first lens L1 is decentered by 1.00 mm to stabilize the image when the tilt angle is 1 degree. In the eighth embodiment, coma can be made smaller than the conventional compensation system.

TABLE 17 shows the values of the first through eighth embodiments ([1]–[8]) for conditions (1), (2), (3), (4) and (5).

TABLE 17

| | Embodiment | | | | | | | |
|---|---|---|---|---|---|---|---|---|
| Condition | [1] | [2] | [3] | [4] | [5] | [6] | [7] | [8] |
| (1) \|tan 1°/φ$_1$\| | 2.25 | 2.27 | 4.00 | 1.80 | 2.00 | 1.00 | 2.01 | 1.00 |
| (2) \|φ$_{23}$/φ$_{13}$\| | 0.20 | 0.54 | 0.59 | 0.00 | 0.10 | 0.98 | 0.40 | 0.97 |
| (3) hi/hx | 1.09 | 1.30 | 1.09 | 1.03 | 1.20 | 1.12 | 1.40 | 1.09 |
| (4) φ$_4$/φ$_{13}$ | −0.04 | −0.22 | −0.09 | −0.28 | — | — | — | — |
| (5) D$_{23}$/f$_{13}$ | — | — | — | — | 0.08 | 0.08 | 0.12 | 0.08 |

TABLE 18

| | L2 · L3 cemented | | | |
|---|---|---|---|---|
| | emb. 1 | emb. 2 | emb. 3 | emb. 4 |
| φ$_1$ | 7.7568E-03 | 7.6908E-03 | 4.3620E-03 | 9.6774E-03 |
| φ$_{23}$ | 2.0150E-03 | −3.7041E-03 | 6.4006E-03 | 5.1241E-08 |
| φ$_{13}$ | 1.0086E-02 | 6.8835E-03 | 1.0861E-02 | 9.5034E-03 |
| φ$_4$ | −4.0855E-04 | −1.5020E-03 | −9.6304E-04 | −2.6940E-03 |
| hi | 0.9662 | 0.6784 | 0.9922 | 0.7767 |
| hx | 0.8835 | 0.5206 | 0.9141 | 0.7534 |
| D$_{2-3}$ | — | — | — | — |
| F$_{1-3}$ | — | — | — | — |

TABLE 19

| | L2 · L3 cemented | | | |
|---|---|---|---|---|
| | emb. 5 | emb. 6 | emb. 7 | emb. 8 |
| φ$_1$ | 8.7335E-03 | 1.7402E-02 | 8.6825E-03 | 1.7392E-02 |
| φ$_{23}$ | −8.9252E-04 | −9.4561E-03 | −3.1923E-03 | −9.1814E-03 |
| φ$_{13}$ | 9.0268E-03 | 9.6943E-03 | 7.8856E-03 | 9.4693E-03 |
| φ$_4$ | — | — | — | — |
| hi | 0.8991 | 0.9157 | 0.9484 | 0.9075 |
| hx | 0.7488 | 0.8199 | 0.6774 | 0.8350 |
| D$_{2-3}$ | 8.868 | 7.870 | 14.950 | 8.200 |
| f$_{1-3}$ | 110.7807 | 103.1536 | 126.8130 | 105.6049 |

All of the embodiment satisfy the conditions (1), (2) and (3). The first through fourth embodiments, in which the second and third lenses are cemented together, satisfy the condition (4). On the other hand, the fifth through eighth embodiments, in which the second and third lenses are not cemented, satisfy the condition (5).

What is claimed is:

1. An optical system for an observing device having an image-vibration compensation system, said optical system including an objective optical system, an erecting system and an observing optical system arranged in the order from an object side, said objective optical system consisting of:

a first lens having positive refractive power, one lens surface of said first lens being an aspherical surface, said first lens being positioned closest to an object side of said objective optical system;

a second lens arranged at the erecting system side of said first lens; and a third lens arranged at the erecting system side of said second lens, wherein one of said second and third lens has positive refractive power and the other has negative refractive power, and wherein said first lens is movable in a direction orthogonal to an optical axis of said objective optical system to compensate an image vibration due to a hand-held shake.

2. The optical system according to claim 1, wherein the following conditions are satisfied:

$$0.5 < |(\tan 1°)/\phi_1| < 5.0 (\text{unit:mm})$$

$$|\phi_{23}/\phi_{13}| < 1.00$$

$$1.0 < hi/hx < 1.5$$

where, $\phi_1$ is a refractive power of said first lens, $\phi_{23}$ is a composite refractive power of said second and third lenses, $\phi_{13}$ is a composite refractive power of said objective optical system, hi is a height from an optical axis of an intersecting point of a paraxial axial ray on the object side surface of said second lens (hi≠0), and hx is a height from an optical axis of an intersecting point of the paraxial axial ray on the erecting system side surface of said third lens.

3. The optical system according to claim 1, wherein said first lens is a plastic lens.

4. The optical system according to claim 1, wherein said second and third lenses are cemented together and the following condition is satisfied:

$$-0.3 < \phi_4/\phi_{13} < 0.0$$

where, $\phi_4$ is a refractive power of the cemented surface of said second and third lenses, and $\phi_{13}$ is a composite refractive power of said objective optical system.

5. The optical system according to claim 1, wherein said second and third lenses are independently positioned without being cemented and the following condition is satisfied:

$$D_{23}/f_{13} < 0.2$$

where, $D_{23}$ is a distance between the object side surface of said second lens and the erecting system side surface of said third lens, and $f_{13}$ is a focal length of said objective optical system.

* * * * *